United States Patent
Lauer

(10) Patent No.: US 10,703,433 B2
(45) Date of Patent: Jul. 7, 2020

(54) DRIVE DEVICE FOR A BICYCLE DRIVEN BY AN ELECTRIC MOTOR

(71) Applicant: QCS Quality Consult Service GmbH, Brülisau (CH)

(72) Inventor: Swen Lauer, Garmisch-Partenkirchen (DE)

(73) Assignee: QCS QUALITY CONSULT SERVICE GMBH, Brülisau (CH)

( * ) Notice: Subject to any disclaimer, the term of this patent is extended or adjusted under 35 U.S.C. 154(b) by 0 days.

(21) Appl. No.: 16/148,060

(22) Filed: Oct. 1, 2018

(65) Prior Publication Data

US 2019/0031278 A1 Jan. 31, 2019

Related U.S. Application Data

(63) Continuation of application No. PCT/EP2017/057681, filed on Mar. 31, 2017.

(30) Foreign Application Priority Data

Apr. 4, 2016 (DE) .................. 10 2016 205 540

(51) Int. Cl.
*B62K 25/28* (2006.01)
*B62M 6/55* (2010.01)
(Continued)

(52) U.S. Cl.
CPC ............ *B62K 25/286* (2013.01); *B62K 19/34* (2013.01); *B62K 25/26* (2013.01); *B62K 25/30* (2013.01); *B62M 6/55* (2013.01); *B62M 9/02* (2013.01)

(58) Field of Classification Search
CPC ...... B62K 25/286; B62K 19/34; B62K 25/26; B62M 6/55; B62M 9/02; B62M 6/40; B62M 6/60; B62M 6/70
See application file for complete search history.

(56) References Cited

U.S. PATENT DOCUMENTS 4,299,582 A * 11/1981 Leitner ................ B62K 25/283
180/227
4,541,500 A * 9/1985 Gelhard .................. B62M 6/60
180/205.2
(Continued)

FOREIGN PATENT DOCUMENTS

EP 2706002 A1 3/2014
EP 3256373 A1 12/2017
(Continued)

OTHER PUBLICATIONS

International Search Report dated Jul. 7, 2017, issued in application No. PCT/EP2017/057681.
(Continued)

*Primary Examiner* — Jacob D Knutson
*Assistant Examiner* — Michael R Stabley
(74) *Attorney, Agent, or Firm* — McClure, Qualey & Rodack, LLP.

(57) ABSTRACT

What is disclosed is a drive device for a bicycle driven by an electric motor, having a main frame having a swing arm bearing, and a rear linkage element arranged at the swing arm bearing. The drive device has a pedal crank as a first drive for providing a first drive force, having a first drive shaft, a center electric motor as a second drive for providing a second drive force, and an output element having an output shaft, configured to receive the first and/or second drive forces and transfer same to the bicycle wheel to be driven. The center axis of the output shaft is radially distanced from the center axis of the first drive shaft and the output shaft is arranged relative to the swing arm bearing such that a radial distance between the center axis of the swing arm bearing and the center axis of the output shaft is smaller than a radial distance between the center axis of the swing arm bearing and the center axis of the first drive shaft.

12 Claims, 15 Drawing Sheets

(51) Int. Cl.
  *B62M 9/02* (2006.01)
  *B62K 19/34* (2006.01)
  *B62K 25/30* (2006.01)
  *B62K 25/26* (2006.01)

(56) References Cited

U.S. PATENT DOCUMENTS

| | | | | |
|---|---|---|---|---|
| 5,074,829 A * | 12/1991 | Menge, Sr. | ............... | F16H 7/06 |
| | | | | 475/182 |
| 5,908,078 A * | 6/1999 | Belil Creixell | ........ | B62K 25/14 |
| | | | | 180/219 |
| 6,203,042 B1 * | 3/2001 | Wilcox | ................ | B62K 25/286 |
| | | | | 280/275 |
| 6,296,072 B1 * | 10/2001 | Turner | .................... | B62M 6/45 |
| | | | | 180/206.2 |
| 6,851,497 B1 * | 2/2005 | Yoshiie | .................... | B62M 6/40 |
| | | | | 180/206.4 |
| 7,210,695 B2 * | 5/2007 | Griffiths | ................. | B62K 25/16 |
| | | | | 280/275 |
| 7,344,468 B2 * | 3/2008 | Chuo | ................... | B62M 11/145 |
| | | | | 180/221 |
| 7,753,157 B1 | 7/2010 | Woods | | |
| 7,938,424 B2 * | 5/2011 | Arraiz | .................. | B62K 25/286 |
| | | | | 280/284 |
| 8,469,381 B2 * | 6/2013 | Dodman | ................. | B62M 6/55 |
| | | | | 280/281.1 |
| 10,358,133 B2 | 7/2019 | Schieffelin | | |
| 2003/0074985 A1 * | 4/2003 | Liao | ......................... | B62J 99/00 |
| | | | | 73/862.195 |
| 2003/0111284 A1 * | 6/2003 | Chou | .................... | B62D 61/02 |
| | | | | 180/220 |
| 2005/0178538 A1 * | 8/2005 | Vincent | .............. | B60H 1/00064 |
| | | | | 165/203 |
| 2005/0246152 A1 * | 11/2005 | Kokatsu | ................... | B62M 6/45 |
| | | | | 703/22 |
| 2006/0030440 A1 * | 2/2006 | Zmurko | .................... | B62M 9/12 |
| | | | | 474/80 |
| 2010/0194182 A1 * | 8/2010 | Katz | ....................... | B62H 5/08 |
| | | | | 301/109 |
| 2011/0284303 A1 * | 11/2011 | Shwartz | ................... | B62M 6/70 |
| | | | | 180/220 |
| 2012/0038130 A1 * | 2/2012 | Wuthrich | ................. | B62K 3/10 |
| | | | | 280/284 |
| 2012/0048635 A1 * | 3/2012 | Kuroki | .................... | B62M 6/45 |
| | | | | 180/206.2 |
| 2014/0060950 A1 | 3/2014 | Beutner | | |
| 2017/0106866 A1 | 4/2017 | Schieffelin | | |

FOREIGN PATENT DOCUMENTS

| | | |
|---|---|---|
| JP | H07-502950 A | 3/1995 |
| JP | 2011-068278 A | 4/2011 |
| WO | 2005/066015 A1 | 7/2005 |
| WO | 2006/034213 A2 | 3/2006 |
| WO | 2016/130833 A1 | 8/2016 |
| WO | 2016130833 A1 | 8/2016 |

OTHER PUBLICATIONS

Japanese office action dated Oct. 29, 2019, issued in application No. JP 2018-551868 and its translation.
European Office Action dated Apr. 3, 2020, issued in application No. 17715442.4.

* cited by examiner

DRIVE DEVICE FOR A BICYCLE DRIVEN BY AN ELECTRIC MOTOR

CROSS-REFERENCE TO RELATED APPLICATIONS

This application is a continuation of co-pending International Application No. PCT/EP2017/057681, filed Mar. 31, 2017, which is incorporated herein by reference in its entirety, and additionally claims priority from German Application No. 10 2016 205 540.2, filed Apr. 4, 2016, which is also incorporate herein by reference in its entirety.

BACKGROUND OF THE INVENTION

The invention relates to a drive device for a bicycle driven by an electric motor, to a bicycle driven by an electric motor comprising such a drive device, and to a bicycle frame comprising such a drive device.

Nowadays, bicycles are frequently used as means of transport and movement. There are different types of bicycles. Full-suspension bicycles are known, for example. These are also referred to in short as fully bikes.

Full-suspension bikes comprise a main frame where a rear linkage element is swingingly supported. A damper element, frequently a steel spring or air damper is provided between the rear linkage element and the main frame.

When designing full-suspension bicycles, there is a conflict of objective between the so-called rocking of the rear linkage element and the so-called pedal kickback. This effect is dependent on the compression and decompression behavior of the rear linkage element relative to the main frame in certain riding dynamics situations.

In particular, riding dynamics situations are considered where the rider applies a high torque using the drive, i.e. using the pedal crank. High torques are particularly applied when starting, riding uphill or accelerating. The force applied when pedaling is guided from the pedal crank to the rear wheel by means of the bike chain.

The rear linkage element tends to compress due to the dynamic bike load distribution occurring when starting, riding uphill, accelerating etc. This compression behavior of the rear linkage element, however, is not desired since a high portion of the drive energy is lost by this.

This is why nowadays the rear linkage element is to be designed such that it has a tendency to decompress when starting, accelerating etc. This decompression behavior can be influenced in dependence on the arrangement of the swing arm bearing relative to the main frame and in dependence on the chain pull direction.

However, too strong of a decompression behavior results in the chain being pulled back, counter-acting the crank movement, due to the decompressing rear linkage element. The result of this is the so-called pedal kickback, which means that, while the rider forces the pedal in one direction, the rear linkage element pulls the pedal in the opposite direction.

This conflict of objective between compression and pedal kickback can be more pronounced in bicycles driven by electric motors, i.e. in so-called e-bikes. The electric motor used in the e-bike may, depending on the set-up of the respective e-bike, be used as the sole driving means, or also as a supportive driving means supporting the pedal movement by the rider. Thus, the electric motor may generate a high torque exceeding the torque provideable by the rider by means of the pedal crank.

Correspondingly, strong a compression and/or an increased pedal kickback usually occur in modern e-bikes.

For illustrating the effects just described, FIG. 13 shows a conventional full-suspension mountain bike 1000. The mountain bike 1000 comprises a main frame 1010 and a rear linkage element 1020. The main frame 1010 comprises a top tube 1011, a saddle tube 1012, a down tube 1013 and a head tube 1014.

The rear linkage element 1020 comprises a seat stay 1021 and a chain stay 1022. The rear linkage element 1020 is connected to the main frame 1010 in a hinged manner. The chain stay 1022 is connected to a swing arm bearing 1023 arranged at the main frame 1010. The seat stay 1021 is connected to a damper 1090 in a hinged manner. In the, in the riding direction, back part, the rear linkage element 1020 comprises a drop-out end 1024 which receives the axis 1050 of the rear wheel 1051.

A pinion packet 1060, which is also referred to as cassette or cogset, is arranged at the wheel hub of the rear wheel 1051. The pinion 1060 comprises several pinions of varying diameters.

The main frame 1010 additionally comprises a bottom bracket 1040. An axis or shaft of a pedal crank 1041 extends through the bottom bracket 1040. The pedal crank 1041 comprises a large chain ring 1042 and a small chain ring 1043.

A drive chain 1030 extends between the front chain rings 1042, 1043 and the rear pinions of the pinion packet 1060. The chain 1030 comprises a top side or tight or load side 1031 of the chain, and a bottom side or slack side 1032 of the chain.

When rotating the pedal crank 1041 (in FIG. 13 in a counter-clockwise direction), the chain 1030 is tensed at the tight side 1031 and transfers the force to the pinion of the pinion packet 1060 engaging in the chain 1030. This force is also referred to as chain pull force $F_C$ and extends along a direction of extension of the tensed chain 1030 or tight side 1031. The direction of extension of the tight side 1031 consequently defines the force action line 1070 of the chain pull force $F_C$.

Since the rear wheel 1051 is suspended on the axis 1050 to be rotatable, the result is an axis force $F_A$ acting on the axis 1050, the force action line 1080 of which is in parallel to the force action line 1070 of the chain pull force $F_C$.

FIG. 14 shows the same conventional mountain bike 1000 again. The full-suspension mountain bike 1000 comprises a damper 1090 arranged between the rear linkage element 1020 and the main frame 2. FIG. 14 shows the mountain bike 1000 in an unloaded state with no rider. As soon as the mountain bike 1000 is loaded, for example, by the weight of the rider, it will be compressed. The rear wheel 1051 here swings upwards along the wheel trajectory 1052. In so-called single pivots, the wheel trajectory 1052 results from the distance between the swing arm bearing 1023 and the rear axis 1050.

Generally, the rear linkage element 1020 of the mountain bike 1000 is able to both compress and decompress. When compressing, the rear wheel 1051 swings upwards along the wheel trajectory 1052. When decompressing, the rear wheel 1051 swings downwards along the wheel trajectory 1052.

In conventional mountain bikes 1000, the damper 1090 is usually adjusted such that, with static loading by the rider's weight of a rider sitting or standing inactively on the mountain bike 1000, it is compressed by about 10% to 30% of the total spring deflection or spring travel. This region is also referred to as negative spring travel or SAG.

As mentioned already, when compressing, the rear wheel 1051 swings upwards along the wheel trajectory 1052. Conventional mountain bikes 1000 nowadays are constructed such that the rear wheel 1051, in SAG, swings to a point such that the rear axis 1050 is located approximately in the construction point 1055 indicated. The result here is an imaginary line 1081 between the deflected rear axis 1055 and the swing arm bearing 1023. In SAG, this line 1081 is in parallel to the road surface 1082.

In the case of compression or decompression of the rear linkage element 1020, the angle position of this line 1081 relative to the road surface 1082 changes. The angle forming between this line 1081 and the road surface 1082 is referred to as suspension (or spring) oblique (or bias) angle. In SAG, in the conventional mountain bike 1000 shown in FIG. 14, a suspension oblique angle of 0° results.

When starting or accelerating, the rider, by using the pedal crank 1041, generates a torque which is transferred to the rear wheel 1051 via the chain 1030, the cassette 1060 and the hub. In particular in riding situations like starting, accelerating or riding uphill, the rider generates a relatively high torque.

In addition, a rider sitting or standing on the bike 1000 generates a high center of gravity which additionally is shifted horizontally in the direction of the rear wheel 1051. When starting, accelerating or riding uphill, the inertia of the entire system of rider and bike 1000 causes a dynamic wheel load distribution, i.e. the center of gravity migrates further backwards, i.e. in the direction towards the rear wheel 1051. With a non-tuned bike, this dynamic wheel load distribution causes the rear linkage element 1020 to compress. This behavior is also referred to as starting torque pitch or squat.

As mentioned already, the state of the art approach is supporting the starting torque pitch by means of chain pull. The chain pull here provides for decompression of the rear linkage element 1020. What is tried here by means of construction techniques is realizing decompression caused by means of the chain pull, to the same extent to which the rear linkage element would otherwise compress due to inertia. This means that one tries to compensate compression of the rear linkage element, caused by the dynamic wheel load distribution, by decompression, of equal magnitude by means of chain pull. This is to be illustrated using the conventional mountain bike 1000 shown in FIG. 14.

As has been mentioned above, the direction of the force $F_A$ acting on the axis 1050 depends, among other things, on the chain pull direction along the force action line 1070 (FIG. 13) for the force $F_C$. In a non-loaded state, the rear axis 1050 at first is located in a bottom position as shown in FIG. 14 where the force $F_{A1}$ acts on the axis 1050 along the force action line 1071. In a compressed state, and particular in SAG, the rear axis 1050 is located in a deflected top position 1055, wherein the force $F_{A2}$ acts on the rear axis 1050.

The force $F_{A2}$ acts along the force action line 1072. As can be recognized from FIG. 14, the force action line 1072 is located between the swing arm bearing 1023.

When the rider, starting from the SAG position, is pedaling and generates a drive torque, the force $F_{A2}$ along the chain pull direction will act on the rear axis 1050 in the construction point 1055. Since the force action line 1072, as has been mentioned before, is located below the swing arm bearing 1023, the force $F_{A2}$ causes decompression of the rear linkage element 1020. This means that the force $F_{A2}$ tries to pull the rear axis 1050 to below the swing arm bearing 1023 so that the rear wheel 1051 moves downward along the wheel trajectory 1052. This decompression movement counteracting the compression movement (starting torque pitch) is also referred to as starting torque pitch support or anti-squat.

Advantageously, it is aimed at, in construction, to arrange the swing arm bearing 1023 relative to the force action line 1072 of the force $F_{A2}$ acting on the axis 1050 such that magnitude and direction of the chain pull force cause decompression, which, when starting and the like, counteracts and advantageously suppresses completely the compression occurring. When the decompression caused by the chain pull completely compensates the starting torque pitch (compression), this is referred to as neutral bike chassis or 100% anti-squat.

The mode of functioning of the chain pull which is an important component in conventional full-suspension mountain bikes for the anti-squat behavior, can be illustrated easily when describing the angular deviation of the chain pull direction in connection with the magnitude of the chain pull force relative to the wheel trajectory normal.

The wheel trajectory normal is a straight which is arranged at an angle of 90° to the direction of compression, i.e., in the case of a single pivot, the normal will intersect the swing arm point of rotation 1023.

The wheel trajectory normal (perpendicular line to the direction of compression) at the same time describes the suspension oblique angle (angle between wheel trajectory normal and road surface).

If the chain pull direction deviates from the trajectory normal, a force of a compressing or decompressing effect is introduced into the rear wheel suspension. The stronger the chain pull force and the greater the angular deviation to the trajectory normal, the stronger the reaction for the rear linkage element. Thus, in a conventional bike, the anti-squat behavior is differing strongly, depending on the gear set, since the chain pull force differs in direction and magnitude for each gear.

A calculation including the drive power of 200 watts provided by a rider is taken as an example here. This corresponds to a crank force of 140N with 60 RPM:

Case 1: Gear combination of 22 teeth in the front and 34 teeth in the back (typical uphill gearing)
  the result here is a chain pull force of 722N and a drive force of 149N, which in turn results in an anti-squat effect of 120% (too much anti-squat or over-compensation)

Case 2: Gear combination of 36 teeth in the front and 11 teeth in the back (typical speed gearing)
  the result here are a chain pull force of 543N and a drive force of 34N, which in turn results in an anti-squat effect of 57% (too little anti-squat or under compensation).

Conclusively, the chain pull force varies strongly in dependence on the gear set. At the same time, the static friction force (drive force) introduced into the ground also varies strongly due to the different gear ratios.

When adding both effects, in a conventional mountain bike, the anti-squat effect varies relatively strongly in dependence on the gear set. The bandwidth of the anti-squat effect in a conventional MTB is between 0 and 200%.

Usually, in an uphill gear (pinion combination of, for example, 22 teeth in the front and 34 teeth in the back), there is a strong chain pull the angle of which, in relation to the wheel trajectory normal, is directed downwards. This results in a rear wheel suspension reacting in a decompressing way, i.e. more than 100% anti-squat. In speed gears (pinion combination of, for example, 36 in the front and 11 in the back), there is lower a chain pull, wherein the direction of effect of the chain pull force relative to wheel trajectory normal is directed upwards. This generates undesired compression of the rear linkage element when pedaling.

In a conventional full-suspension bike, due to these correlations, the desirable most precisely 100% anti-squat exists only for a single specific gear combination.

As has been mentioned before referring to FIGS. 13 and 14, what is strived for is constructing the mountain bike 1000 such that the force action line 1072 and the swing arm bearing 1023 are oriented relative to each other such that the chain pull results in a decompression movement, the magnitude of which corresponds to the magnitude of the starting torque pitch (compression).

In order to realize this, conventional mountain bikes 1000 are constructed such that, in SAG, they exhibit a suspension oblique angle of 0°, i.e. the imaginary connective line 1081 between the swing arm bearing 1023 and the rear axis 1050 is in parallel to the road surface 1082. This offers a good starting point for implementing the direction of the force action line 1072 relative to the swing arm bearing 1023 such that high a starting torque pitch support can be achieved.

Providing a suspension oblique angle of 0° additionally is of advantage in that drive influences which are caused by the kinematics of the rear linkage element, can mostly be ignored so that the starting torque pitch support, i.e. the decompression magnitude, may be determined solely by the chain pull (magnitude and direction).

However, as has been mentioned before, there is the conflict of objective between the starting torque pitch support caused by chain pull and the so-called pedal kickback. Due to the decompression caused deliberately by means of the chain pull, the rear wheel 1051 moves downwards along the wheel trajectory 1052. The result is a change in horizontal length between the rear wheel axis 1050 and the bottom bracket. When decompressing, this horizontal distance between rear wheel axis 1050 and bottom bracket 1040 increases. This in turn causes a corresponding increase in the tight side 1031 of the chain 1030. However, since the chain 1030 is relatively rigid, the chain 1030 pulls the crank 1040 backwards, opposite to the actual pedaling direction.

Conventional mountain bikes 1000, in SAG, usually comprise a suspension oblique angle (wheel trajectory normal) of 0°, which means that the wheel trajectory normal is parallel to the road surface. In conventional full-suspension mountain bikes 1000, the anti-squat is generated exclusively by chain pull, i.e. if the chain pull is directed downwards, the result will be an anti-squat effect. If the chain pull is directed upwards, the result will be a squat effect. Thus, the chain pull direction is dependent on the gear combination selected.

A deviation of the chain pull direction from the trajectory normal in turn will generate an undesired effect on the crank. If the chain pull vector in relation to the trajectory normal is directed downwards, the result will be a back rotation of the crank when compressing, i.e. pedal kickback. If the chain pull vector in relation to the trajectory normal is directed upwards, the result will be a forward rotation of the crank when compressing, i.e. a so-called pedal front kick. This means that nowadays there is a conflict of objective between anti-squat and pedal backlash.

FIGS. 13 and 14 relate to so-called single pivots where drop-out end 1024 for receiving the rear wheel 1051 is arranged at one end of the chain stay 1022 and the swing arm bearing 1023 for hinge-support at the main frame 1010 is provided at the opposite end of the chain stay 1022.

Further well-known concepts, as exemplarily shown in FIG. 15, describe a multi pivot where an additional hinge 1056 is provided, for example below the drop-out end 1024 in the region of the chain stay 1022. This results in a different wheel trajectory 1052 when compared to the single pivot described before. The wheel trajectory 1052 here does no longer follow a simple circular path around the swing arm bearing 1023 with a radius resulting from the distance between the swing support 1023 and the chain stay bearing 1050. Instead, the wheel trajectory 1052 is determined by means of the instant center, while trying to provide a wheel trajectory which is directed perpendicularly upwards to the best degree possible, with no appreciable curvature.

The instant center $M_1$ is the point of intersection of the two straights or the two so-called links 1083, 1084. The first link 1083 is the straight passing through the additional bearing 1056 and through the swing arm bearing 1023. The second link 1084 is the straight passing through the hinge 1025 between the rear linkage element (seat stay 1021) and rocker 1024 and through the pivot point 1026 of the rocker 1024 at the main frame 1010.

For setting up the straight 1081, a connection is drawn between the rear axis bearing 1050 and the instant center $M_1$. In the multi pivot shown in FIG. 15, the frame is also set up such that the line 1081 is in parallel to the road surface 1082 when the bike is in the SAG. In other words, the multi pivot is set such that a suspension oblique angle of 0° results, which means that the anti-squat is controlled by means of the chain pull.

In conventional bikes, like the mountain bikes 1000 just described, providing a starting torque pitch support by means of the chain pull can be realized easily, since the pedaling force provided by the rider, and thus the drive torque introduced to the rear wheel, can be predicted very well for the engineers.

Bicycles driven or supported by an electric motor nowadays are also constructed such that the starting torque pitch support is realized by means of the chain pull. However, in particular in riding situations where large a drive torque acts, like when starting, accelerating or riding uphill, the additional torque of the electric motor causes the rear linkage element of conventional bikes to decompress excessively. On the one hand, this results in an unfamiliar and partly insecure riding behavior of the bike and, on the other hand, in a strong pedal backlash.

Consequently, when constructing the conventional bikes such that the starting torque pitch support works very well for drive by means of muscle power, when starting the electric motor, the rear linkage element will decompress too strongly. If the rear linkage element of a conventional bike, however, is optimized to a starting torque pitch support for the torque of the electric motor, the rear linkage element would compress too strongly when pedaling. This is why, nowadays, compromises have to be accepted in order to satisfy both situations at least to a certain degree.

SUMMARY

According to an embodiment, a drive device for a bicycle driven by an electric motor, having a main frame having a swing arm bearing, and a rear linkage element arranged at the swing arm bearing, may have: a pedal crank as a first drive for providing a first drive force, the first drive having a first drive shaft, a center electric motor as a second drive for providing a second drive force, and an output element having an output shaft, the output element being configured to receive the first and/or second drive forces and transfer the same to the wheel of the bicycle to be driven, wherein the center axis of the output shaft is radially distanced from the center axis of the first drive shaft and the output shaft is arranged relative to the swing arm bearing such that a radial distance between the center axis of the swing arm bearing and the center axis of the output shaft is smaller than a radial distance between the center axis of the swing arm bearing and the center axis of the first drive shaft.

Another embodiment may have a usage of an inventive drive device as mentioned before in a bicycle driven by an electric motor.

Another embodiment may have a bicycle driven by an electric motor, having an inventive drive device.

Still another embodiment may have a bicycle frame having a main frame having a swing arm bearing, a rear linkage part arranged at the swing arm bearing, and an inventive drive device.

The inventive drive device is provided for being used in e-bikes and, in particular, in full-suspension e-bikes. The inventive concept comprises providing a starting torque pitch support suitable for such e-bikes partly by means of chain pull and partly by means of specific rear linkage element kinematics. The present invention provides for realizing a rear linkage element behavior which is as neutral as possible, both when pedaling and when connecting the electric motor. In accordance with the invention, the transmission output is arranged to be offset to a drive, i.e. the pedal crank. In addition, the swing arm bearing is arranged to be close to the output. Close to the output means that the swing arm bearing is arranged closer to the output than to the drive. In other words, a radial distance between a center axis of the swing arm bearing and a center axis of the output shaft is smaller than a radial distance between the center axis of the swing arm bearing and a center axis of the first drive shaft. Due to this combination of an output offset to the drive and the arrangement of the swing arm bearing in direct proximity to the output, what results is a way of realizing a starting torque pitch support by means of chain pull and by means of the rear linkage element kinematics, i.e. by means of pivoting the rear linkage element relative to the main frame. This applies to both single pivots and multi pivots. Due to the radially offset output, the result is a relatively steep angle of the chain stay, which in turn results in stronger decompression of the rear linkage element. Due to these kinematic measures, the pitch caused by the additional torque of the electric motor can be supported. At the same time, arranging the output element close to the swing arm bearing provides for the starting torque pitch support needed when pedaling still to be influenceable by means of the chain pull, and keep being influenceable.

In accordance with an embodiment, the swing arm bearing may be positioned at the main frame such that the bicycle comprises a suspension oblique angle of 5° to 30°, advantageously 10° to 20° and even more advantageously of about 15° if the bike is subjected to a static load resulting in a negative spring deflection range between 10% and 35% of the total spring deflection. In other words, the bike comprises a suspension oblique angle in the indicated regions when being in the SAG. Providing a suspension oblique angle in the indicated regions results in a chassis-kinematics-conditioned starting torque pitch support with an increased torque and is of particular advantage in single pivots.

Another embodiment is of particular advantage for multi pivots where an instant center is designed to be an instantaneous center of rotation. In accordance with such an embodiment where the rear linkage element is configured to be a multi pivot having an instant center as an instantaneous center of rotation, the rear linkage element may be positioned at the main frame such that the bike comprises a suspension oblique angle of 5° to 30°, advantageously 10° to 20° and even more advantageously of about 15° if the bike is subjected to a static load resulting in a negative spring deflection between 10% and 35% of the total spring deflection. In other words, the bike comprises a suspension oblique angle in the indicated region when being in the SAG. Providing a suspension oblique angle in the indicated regions results in a chassis-kinematics-conditioned starting torque pitch support with an increased torque and is of particular advantage in multi pivots.

In accordance with an embodiment, the radial distance between the center axis of the first drive shaft and the center axis of the output shaft may be 200 mm to 30 mm and advantageously between 100 mm and 200 mm. Expressed differently, the distance between the pedal crank shaft and the output is 200 mm to 300 mm and advantageously 100 mm to 200 mm. Such an offset between drive and output has proven to be of particular advantage for providing a suitable starting torque pitch support.

In accordance with another embodiment, the radial distance between the center axis of the swing arm bearing and the center axis of the output shaft may be less than 200 mm, advantageously less than 100 mm and even more advantageously less than 50 mm. In other words, the offset or distance between the swing arm bearing and the output is less than 200 mm, advantageously less than 100 mm and even more advantageously less than 50 mm. The swing arm bearing is consequently arranged to be close to the output. This embodiment of course applies while keeping to the inventive concept relating to the distance between the radial distance between the center axis of the swing arm bearing and the center axis of the output shaft being smaller than the radial distance between the center axis of the swing arm bearing and the center axis of the first drive shaft. In accordance with this embodiment, the swing arm bearing may be arranged around the output with a radius of less than 200 mm, advantageously less than 100 mm and even more advantageously less than 50 mm. This allows a certain fine tuning or fine adjusting of the extent of compression or decompression of the rear linkage element, i.e. of the driving torque pitch support.

In accordance with another embodiment, the center axis of the swing arm bearing, relative to a plane in parallel to the road surface, may be arranged above the center axis of the output. The swing arm bearing may consequently be arranged in a semi-circle above the output. Considering the chain pull direction, the extent of decompression of the rear linkage element may be fine-adjusted in the top semi-circle.

In accordance with another embodiment, the center axis of the swing arm bearing, relative to a plane in parallel to the road surface, may be arranged below the center axis of the output. The swing arm bearing may consequently be arranged in a semi-circle below the output. While considering the chain pull direction, the extent of compression of the rear linkage element may be fine-adjusted in the lower semi-circle.

In accordance with an embodiment, the radial distance between the center axis of the output shaft and the center axis of the swing arm bearing may equal zero so that the center axis of the output shaft and the center axis of the swing arm bearing are arranged to be concentric. In other words, there is an offset or radial distance between the first drive (pedal crank) and the output, and between the swing arm bearing and the output. The offset or radial distance between the output and the swing arm bearing, in accordance with this embodiment, however, equals zero, i.e. the swing arm bearing and the output are arranged to be concentric or coaxial. The condition from claim 1 is nevertheless still fulfilled since the offset or radial distance between the output and the swing arm bearing is smaller than the offset or radial distance between the first drive (pedal crank) and the swing arm bearing. This means that the swing arm bearing is arranged to be closer to the output (coaxial) than to the drive. Due to this coaxial arrangement of the output and the swing arm bearing, drive influences can be kept as small as possible since chain lengthening, which would cause an undesired pedal kickback, occurs neither in compression nor in decompression.

In accordance with another embodiment, the output and the center electric motor may be arranged relative to each other such that the center axis of the output and the center axis of an output shaft of the center electric motor are arranged to be concentric. In other words, the center electric motor and the output comprise a common axis or output shaft.

This means that the output is arranged directly at the center electric motor. Thus, the output and the electric motor may be arranged in a place-saving manner within the drive device and, in particular, within a casing of the drive device.

In accordance with another embodiment, the output element is able to transmit the drive force to the bicycle wheel to be driven by means of force transmission means, in particular by means of a chain or cog belt or V-belt and the force transmission means may be arranged between the output element and the wheel such that, by means of applying a pull force to a tight side of the force transmission means, a force is applied to the rear axis, the force action line of which passes below the center axis of the swing arm bearing or below the instant center if the bike is subjected to a static load resulting in a negative spring deflection between 10% and 35% of the total spring deflection. When the bike is in the SAG, the force transmission means passes between the rear wheel and the crank such that the direction of pull of the force transmission means causes a force on the rear wheel axis the force action line of which passes below the swing arm bearing. This force results in decompression of the rear linkage element. Exemplarily, with chain drive, a pinion packet including usually nine to eleven pinions of different sizes is arranged at the rear wheel hub. One to three chain rings are arranged at the crank. The rear linkage element will decompress most strongly, i.e. the greatest anti-squat behavior will be achieved, if the chain pull direction exhibits a great angle relative to the swing arm bearing, i.e. if the chain runs on the smallest chain ring and the largest pinion. The embodiment mentioned relates to a chain pull direction where the chain moves on the smallest chain ring in the front and one of the five largest pinions in the back.

In accordance with an embodiment, the drive device may be arranged to be stationary or immobile at the main frame. In the center electric motor suggested, the drive device may be arranged fixedly, i.e. immobile between the down tube, the bottom bracket casing and, if applicable, the saddle tube. The drive device is consequently supported at the main frame. This is to be differentiated from drive concepts with electric motor drive devices arranged in the wheel hubs, and drive concepts comprising a drive unit swing arm. In the latter, the electric motor drive device is not arranged in or at the main frame, but in the swing arm. The electric motor drive unit here is supported at the swing arm arranged at the frame to be moveable. Thus, the electric motor drive unit is arranged at the main frame to be moveable via the swing arm. If, in an inventive main frame, a rear swing arm is removed, the electric motor drive unit will still be arranged at the main frame. If, in contrast, removing the rear swing arm from the main frame in a drive unit swing arm, the main frame does no longer comprise an electric motor drive unit since the same is integrated in the swing arm.

A second aspect of the invention relates to using a drive device in accordance with any of the embodiments mentioned above in a bicycle driven by an electric motor.

A third aspect of the invention relates to a bicycle driven by an electric motor, comprising a drive device in accordance with any of the embodiments mentioned above.

In accordance with a first embodiment of the third aspect, a bicycle driven by an electric motor, comprising a main frame having a swing arm bearing and a rear linkage element arranged at the swing arm bearing, and a drive device for such a bicycle driven by an electric motor is suggested, the drive device comprising: a pedal crank as a first drive for providing a first drive force, wherein the first drive comprises a first drive shaft, a center electric motor as a second drive for providing a second drive force, and an output element comprising an output shaft, the output element being configured to receive the first and/or second drive forces and output same to the bicycle wheel to be driven, wherein the center axis of the output shaft is radially distanced from the center axis of the first drive shaft and the output shaft is arranged relative to the swing arm bearing such that a radial distance between the center axis of the swing arm bearing and the center axis of the output shaft is smaller than a radial distance between the center axis of the swing arm bearing and the center axis of the first drive shaft.

In accordance with a second embodiment, a bicycle driven by an electric motor, comprising a drive device in accordance with the first embodiment is suggested, wherein the swing arm bearing is positioned at the main frame such that the bicycle comprises a suspension oblique angle of 5° to 30°, advantageously 10° to 20° and even more advantageously of about 15° if the bicycle is subjected to a static load resulting in a negative spring deflection between 10% and 35% of the total spring deflection.

In accordance with a third embodiment, a bicycle driven by an electric motor, comprising a drive device in accordance with the first or second embodiment is suggested, wherein the rear linkage element is implemented to be a multi pivot having an instant center as an instantaneous point of rotation, and the rear linkage element is positioned at the main frame such that the bicycle comprises a suspension oblique angle of 5° to 30°, advantageously 10° to 20° and even more advantageously of about 15° if the bicycle is subjected to a static load resulting in a negative spring deflection between 10% and 35% of the total spring deflection.

In accordance with a fourth embodiment, a bicycle driven by an electric motor, comprising a drive device in accordance with any of the preceding embodiments is suggested, wherein the radial distance between the center axis of the first drive shaft and the center axis of the output shaft is 200 mm to 300 mm and advantageously 100 mm to 200 mm.

In accordance with a fifth embodiment, a bicycle driven by an electric motor, comprising a drive device in accordance with any of the preceding embodiments is suggested, wherein the radial distance between the center axis of the swing arm bearing and the center axis of the output shaft is less than 200 mm, advantageously less than 100 mm and even more advantageously less than 50 mm.

In accordance with a sixth embodiment, a bicycle driven by an electric motor, comprising a drive device in accordance with any of the preceding embodiments is suggested, wherein the center axis of the swing arm bearing, relative to a plane in parallel to the road surface, is arranged above the center axis of the output element.

In accordance with a seventh embodiment, a bicycle driven by an electric motor, comprising a drive device in accordance with any of the first to fifth embodiments is suggested, wherein the center axis of the swing arm bearing, relative to a plane in parallel to the road surface, is arranged below the center axis of the output element.

In accordance with an eighth embodiment, a bicycle driven by an electric motor, comprising a drive device in accordance with any of the first to fifth embodiments is suggested, wherein the radial distance between the center axis of the output shaft and the center axis of the swing arm bearing equals zero so that the center axis of the output shaft and the center axis of the swing arm bearing are arranged concentrically.

In accordance with a ninth embodiment, a bicycle driven by an electric motor, comprising a drive device in accordance with any of the preceding embodiments is suggested, wherein the output element and the center electric motor are arranged relative to each other such that the center axis of the output element and the center axis of an output shaft of the center electric motor are arranged concentrically.

In accordance with a tenth embodiment, a bicycle driven by an electric motor, comprising a drive device in accordance with any of the preceding embodiments is suggested, wherein the output element transfers the drive force to the bicycle wheel to be driven by means of force transmission means, in particular by means of a chain or cog belt or V belt, and the force transmission means is arranged between the output element and the wheel such that a force is applied to the rear axis by means of pull force applied to a tight side of the force transmission means, the force action line of which passes below the center axis of the swing arm bearing or below the instant center if the bicycle is subjected to a static load resulting in a negative spring deflection between 10% and 35% of the total spring deflection.

In accordance with an eleventh embodiment, a bicycle driven by an electric motor, comprising a drive device in accordance with any of the preceding embodiments is suggested, wherein the drive device is arranged at the main frame to be immobile.

Another aspect of the invention relates to a bicycle frame comprising a main frame having a swing arm bearing, a rear linkage element arranged at the swing arm bearing, and a drive device in accordance with any of the preceding embodiments.

BRIEF DESCRIPTION OF THE DRAWINGS

Embodiments of the invention are illustrated in the drawings and will be discussed below, in which.

DETAILED DESCRIPTION OF THE INVENTION

So-called e-bikes are generally meant by the term bicycles driven by an electric motor. Among these types of e-bikes which, for defining the present disclosure, fall under the term bicycle driven by an electric motor, are both bicycles driven by an electric motor which may be driven exclusively by the drive force of an electric motor, and bicycles supported by an electric motor which can switch in a drive force of an electric motor in support of the pedaling force.

The shaft of the first drive, the shaft of the output element and an output shaft of the electric motor comprise a direction of extension along their longitudinal axis. A radial distance in the sense of the present disclosure relates to this longitudinal axis passing in the direction of extension of the respective shaft, which means that radial means a radial direction when starting from the longitudinal axis. The direction of extension of the longitudinal axis is usually roughly orthogonal to a vertical central plane of the bicycle extending between the rear wheel and the front wheel.

The invention is, among other things, based on having recognized that a starting torque pitch support may be realized by means of varying the kinematics of the rear linkage element. The technical background is to be discussed below briefly making reference to FIG. 1.

Figure 1:
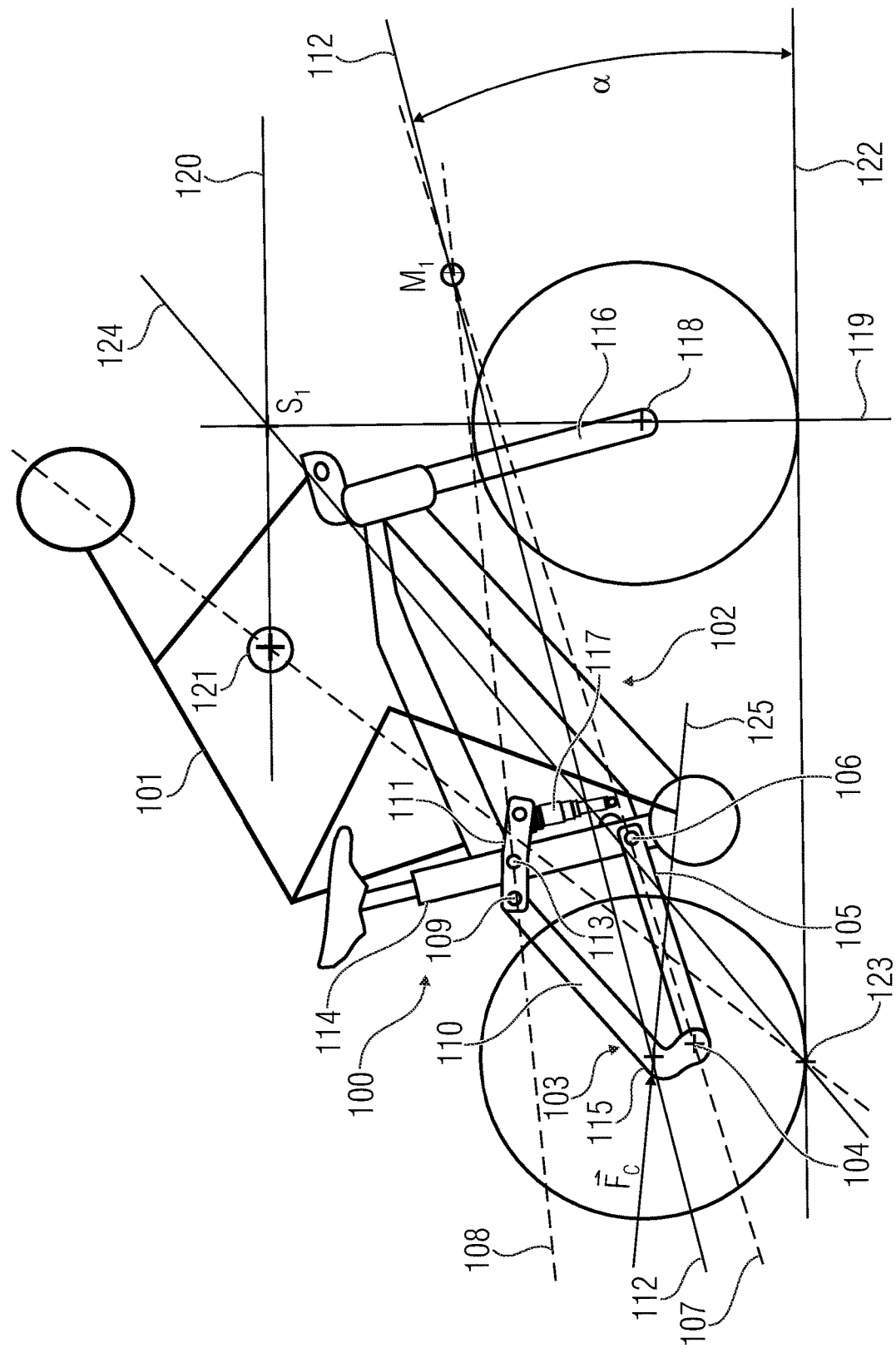
FIG. 1 shows a schematic drawing of a full-suspension bicycle comprising a rear linkage element implemented as a multi pivot.

FIG. 1 shows a full-suspension mountain bike 100 with a person 101 sitting thereon. The mountain bike 100 comprises a main frame 102 and a rear linkage element swingingly arranged at the main frame 102. The rear swing element 103 is designed to be a multi-pivot element having an additional point of rotation 104 in the region of the chain stay 105.

An instant center $M_1$ which is considered to be the instantaneous point of rotation at a time $t_1$ can be designed for this multi-pivot element. The instant center $M_1$ is the point of intersection of a first straight 107 and a second straight 108. The first straight 107 passes through the additional point of rotation 104 in the region of the chain stay 105 and through the swing arm bearing 106. The second straight 108 passes through the pivot point 109 between the seat stay 110 and the rocker 111 and through the pivot point 113 between the seat tube 114 and the rocker 111.

Another straight 112 may be defined through the instant center $M_1$ and the rear axis 115. This straight 112 defines the suspension oblique angle α of the bicycle 100. As has been mentioned above, conventional bicycles are designed such that they comprise a suspension oblique angle of α=0°. However, the present invention makes use of, among other things, the realization that a starting torque pitch support may be realized by suitably selecting the suspension oblique angle α.

The suspension oblique angle α generates a support effect which in certain riding situations of high torque, for example when accelerating, starting or riding uphill, prevents the rear wheel suspension from being compressed by the dynamic wheel load shifting. In particular in e-bikes, due to the greater drive power and the stronger ability to accelerate, an effective starting torque pitch support is desirable.

In an electrically driven mountain bike, for example, a suspension oblique angle of about 15° in a state of static compression is very good. This state of static compression is also referred to as SAG. The SAG results if the bicycle is subjected to a static load resulting in a negative spring deflection between 10% and 35% of the total spring deflection. This means that, if the rider 101 sits or stands on the bike 100 and does not move, he or she will apply a static load to the bike 100 by his or her weight alone, the load having a weight force G. Both the suspension fork 116 arranged in the front and the damper 117 arranged in the back are compressed here.

Ideally, the fork 116 and the damper 117 are to be compressed by about 10% to 35% of their respective total spring deflection. This range is also referred to as SAG or negative spring deflection. Thus, the spring elements 116, 117 comprise a sufficient range in order to be both compressed and decompressed while riding the bike. The bike 100 illustrated in FIG. 1 is shown in the SAG, i.e. the bike is subjected to a static load resulting in a negative spring deflection between 10% and 35% of the total spring deflection.

The theory behind the chassis-kinematically realizeable starting torque pitch support is that, starting from the front wheel axis 118, a perpendicular 119 to the horizontal 120 of the center of gravity 121 (bicycle 100 and rider 101 form a center of gravity 121 over the road 122) is generated. The point of intersection between these two lines will produce a construction point $S_1$.

An oblique rising straight 124 can be drawn between this point of intersection $S_1$ and the rear wheel contact point 123. This straight 124 is the so-called "squat line".

If the suspension oblique angle α and the squat line 124 are parallel to each other, this is referred to as a 100% anti-squat bike chassis. In this case, the bike chassis does not react to accelerations, which means that it is neither compressed nor decompressed. If the suspension oblique angle α is below the squat line 124, the rear linkage element will compress when accelerating, starting etc. If the suspension oblique angle α is above the squat line 124, the rear linkage element will decompress when accelerating, starting etc.

If, for example, the wheel base is increased or the height of the center of gravity 121 above the road 122 is reduced, consequently smaller a suspension oblique angle α will be used in order to keep the starting torque pitch support to the same extent.

Figure 13:
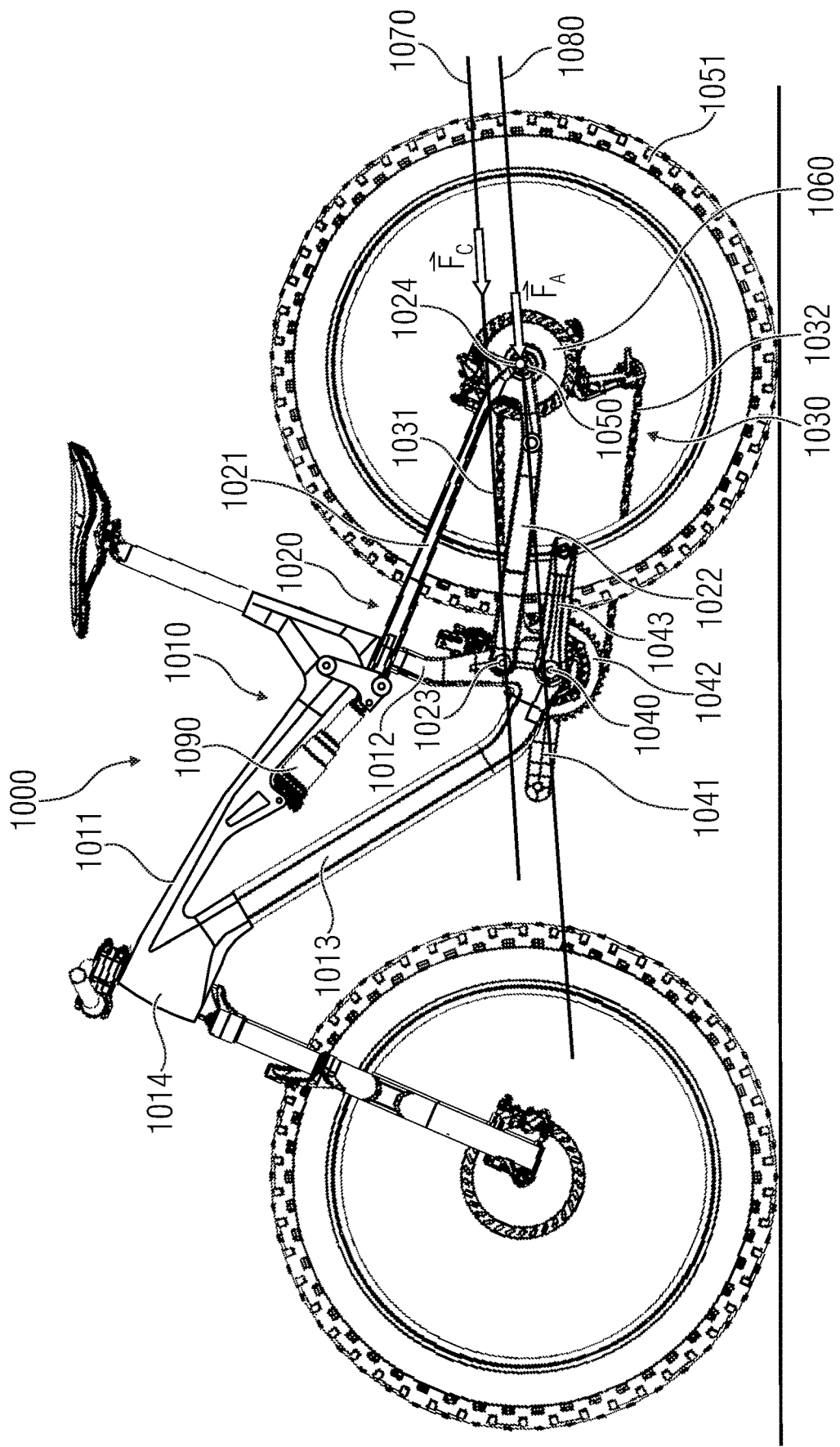
FIG. 13 shows a side view of a conventional prior-art full-suspension bicycle.
Figure 14:
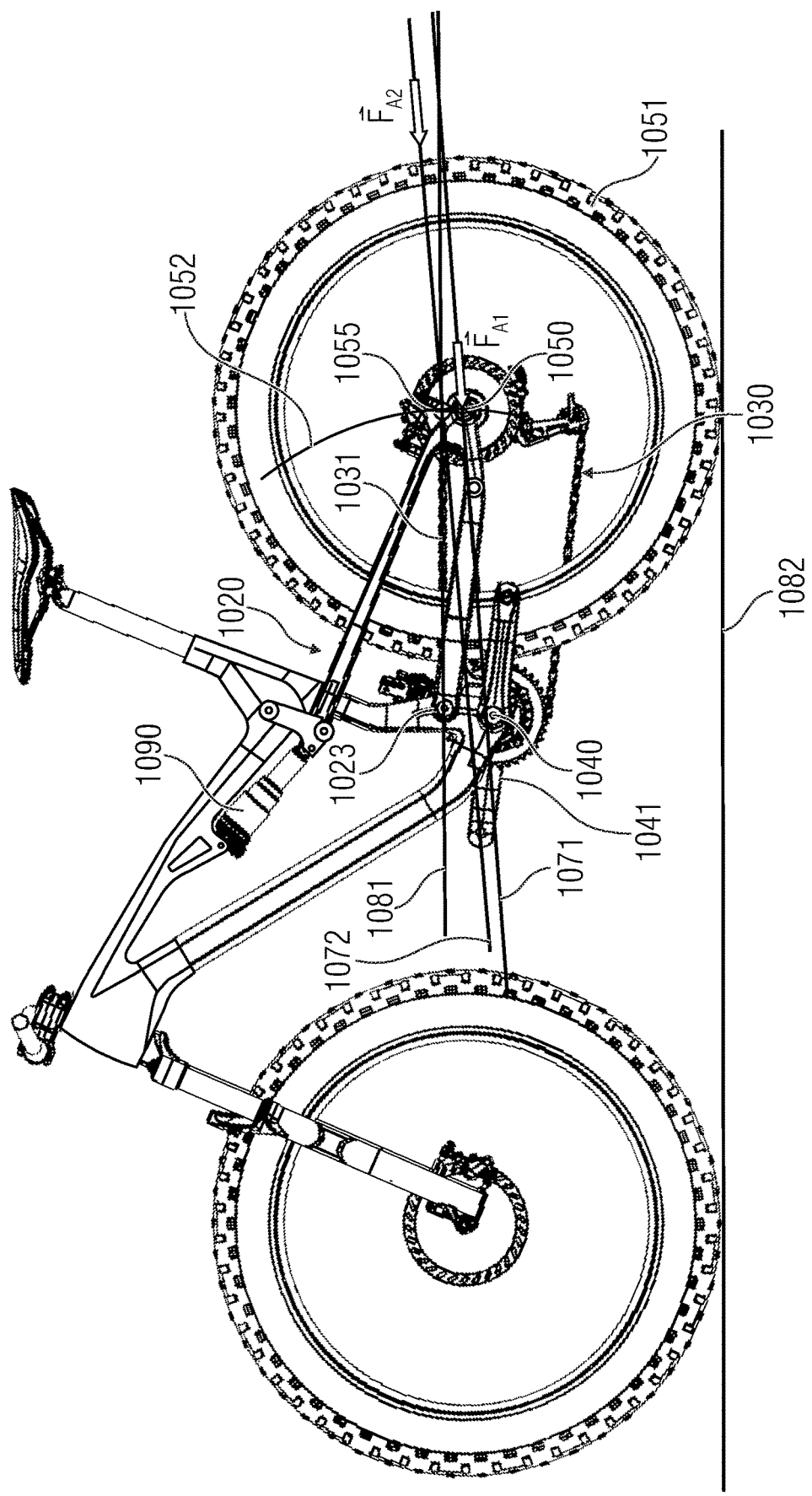
FIG. 14 shows another side view of a conventional prior-art full-suspension bicycle.
Figure 15:
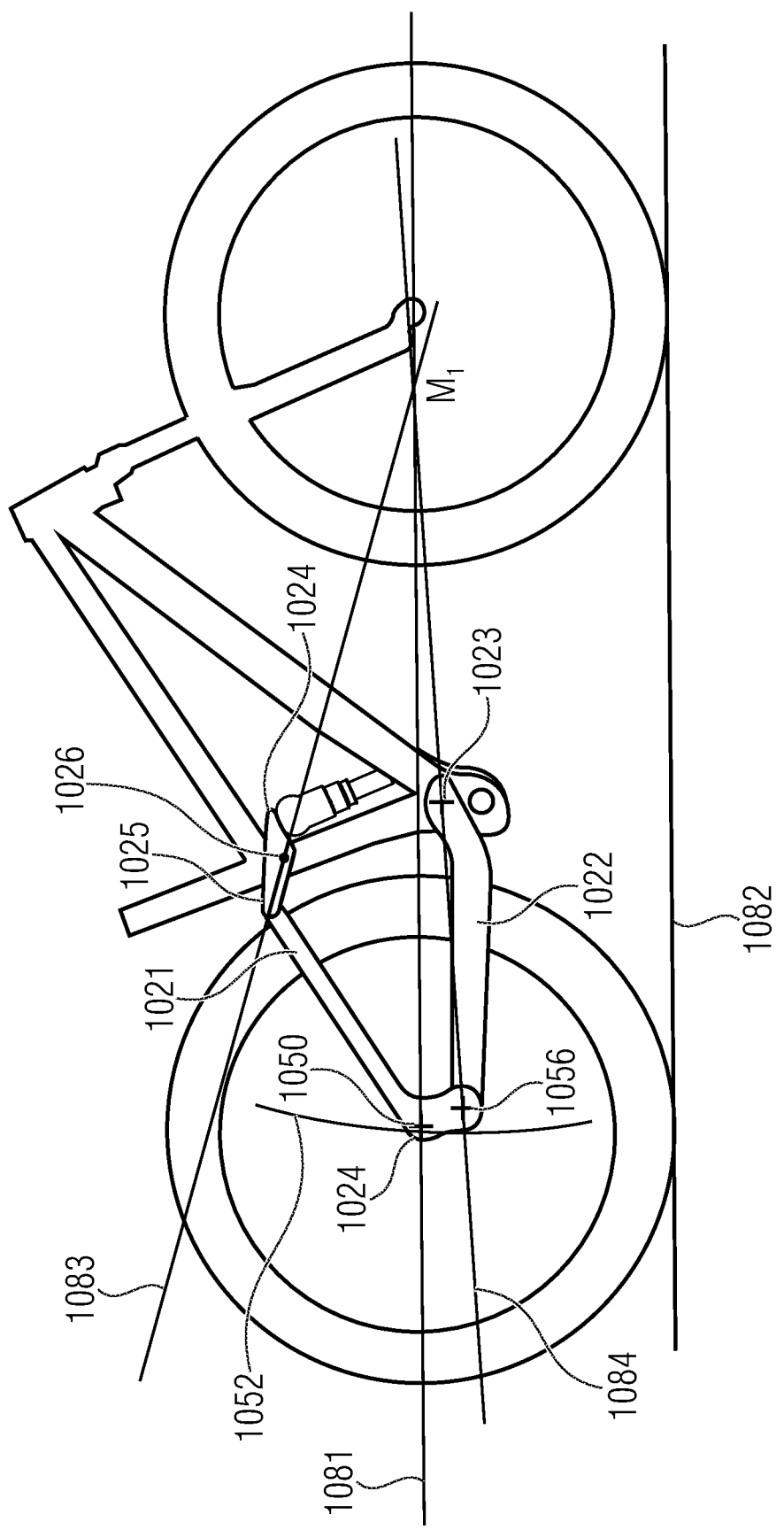
FIG. 15 shows a schematic drawing of a full-suspension bicycle for discussing determining the instant center.

As has already been discussed before referring to FIG. 13, the direction of the force $F_A$ applied to the rear wheel axis depends, among other things, on the chain pull direction $F_C$. When having a closer look at the bicycle 100 in FIG. 1 under this aspect, it can be realized that the force $F_A$ applied to the rear wheel axis 115 is on a force action line 125 which is located relatively far below the swing arm bearing 106. The result of this is an excessive decompression of the rear linkage element when accelerating, starting or riding uphill etc.

When compared to bicycles driven by muscle power, e-bikes provide greater a torque, i.e. the chain pull force $F_C$ and also the force $F_A$ applied to the rear wheel axis 115 are considerably greater. This provides for stronger a decompression of the rear linkage element in e-bikes. In the end, what follows from what has been mentioned above is that a suspension oblique angle of α>0° in e-bikes will result in an undesired and much too strong decompression of the rear linkage element, due to the increased torque.

This is why conventional bikes, also e-bikes, nowadays comprise a suspension oblique angle in the SAG of α=0° and the starting torque pitch support is regulated via the chain pull. However, the present invention realizes a starting torque pitch support both by means of the chain pull and by means of the bike chassis kinematics.

Figure 2:
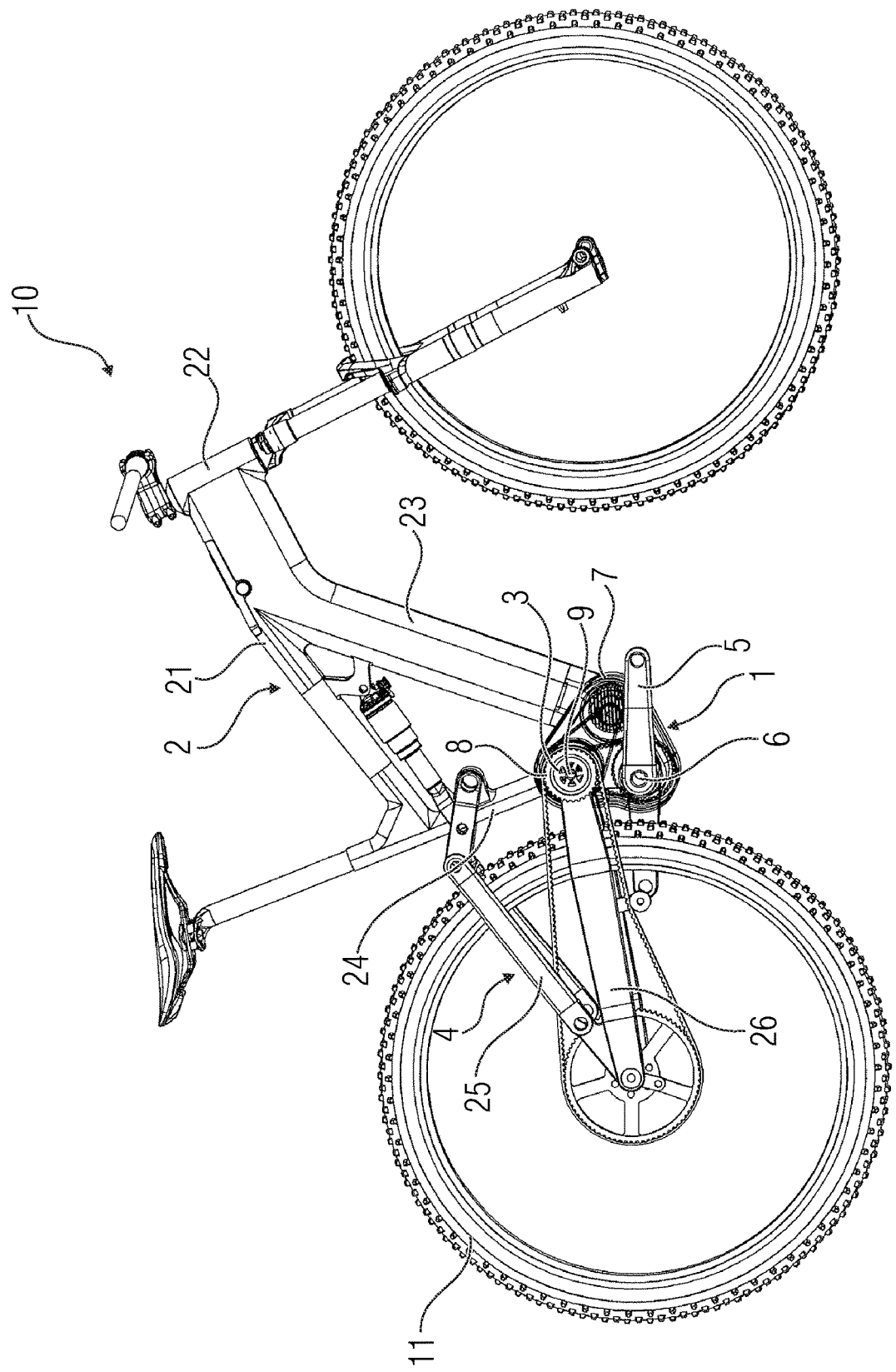
FIG. 2 shows a side view of a bicycle driven by an electric motor, comprising an inventive drive device.

FIG. 2 shows a bicycle 10 driven by an electric motor, comprising an inventive drive device 1. The bicycle 10 driven by an electric motor may also be referred to as e-bike. This may be a classic e-bike where the motor power can be regulated by means of a twist handle or the like and the e-bike may be driven solely by the electric motor. However, this may also be a so-called pedelec where the rider is supported when pedaling by switching in the electric motor in a way regulated by load.

The bicycle 10 driven by an electric motor comprises a main frame 3. Usually, the main frame 10 consists of a top tube 21, a head tube 22, a down tube 23 and a seat tube 24. The bicycle 10 driven by an electric motor is a full-suspension bicycle, a so-called fully bike.

The main frame 2 additionally comprises a swing arm bearing 3 and a rear linkage element 4 arranged at the swing arm bearing 3. The rear linkage element 4 is arranged at the swing arm bearing 3 and thus connected to the main frame 2 in a hinged manner. The rear linkage element 4 usually comprises a chain stay 26 and a seat stay 25. As can be recognized in FIG. 2, the chain stay 26 may exemplarily be arranged at the swing arm bearing 3. The rear linkage element may be implemented as a single pivot or a multi pivot.

The drive device 1 comprises a pedal crank 5. The pedal crank 5 serves as a first drive for providing a first drive force. The pedal crank 5, or first drive, comprises a first drive shaft 6. The drive shaft 6 may be an axis or shaft of the pedal crank 5 connected to a crank arm.

In addition, the drive device 1 comprises a center electric motor 7. The center electric motor 7 serves as a second drive for providing a second drive force. As can be recognized from FIG. 2, the center electric motor 7 is arranged about in the center, i.e. between the front wheel and the rear wheel of the bicycle 10. More precisely, the center motor 7 is arranged between the down tube 34 and the seat tube 24. This embodiment of a center motor 7 is to be differentiated from other drive concepts, like wheel hub motors.

Additionally, the drive device 1 comprises an output element 8 having an output shaft 9. The output element 8 is configured to receive the first and/or second drive forces and transfer same to the wheel 11 of the bike 10 to be driven.

Figure 3:
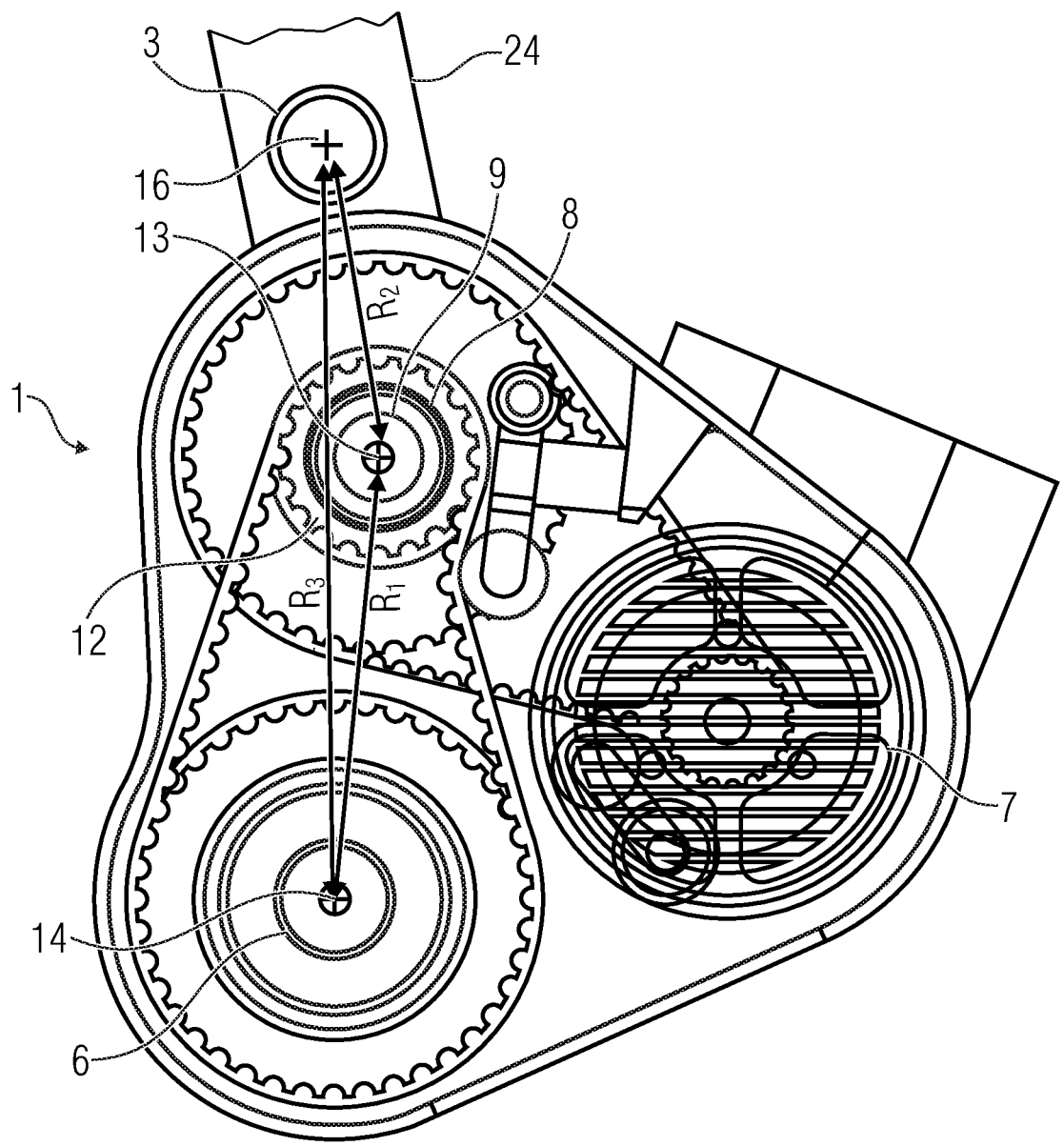
FIG. 3 shows a side view of an inventive drive device.

FIG. 3 shows an enlarged illustration of the drive device 1. The first drive shaft 6 and the electric motor 7 can be recognized. Additionally, the output element 8 can be recognized. The output element 8 is exemplarily illustrated as an output shaft 9 having a gear 12 arranged thereon. The center axis 13 of the output shaft 9 is radially distanced ($R_1$) from the center axis 14 of the first drive shaft 6.

In addition, FIG. 3 shows a swing arm bearing 3 arranged at the main frame 2. The swing arm bearing 3 is arranged at the seat tube 24 illustrated. A swing arm or the rear linkage element 4 is arranged at the swing arm bearing 3 and thus connected to the main frame 2. The rear linkage element 4, however, is not illustrated in FIG. 3 for reasons of clarity.

In accordance with the invention, the output shaft 9 is arranged relative to the swing arm bearing 3 such that a radial distance $R_2$ between the center axis 16 of the swing arm bearing 3 and the center axis 13 of the output shaft 9 is smaller than a radial distance $R_3$ between the center axis 16 of the swing arm bearing 3 and the center axis 14 of the first drive shaft 6.

In accordance with an embodiment, the radial distance $R_1$ between the center axis 14 of the first drive shaft 6 and the center axis 13 of the output shaft 9 is about 200 mm to 300 mm and advantageously about 100 mm to 200 mm.

In accordance with an embodiment, the radial distance $R_2$ between the center axis 16 of the swing arm bearing 3 and the center axis 13 of the output shaft 9 is less than 200 mm, advantageously less than 100 mm and even more advantageously less than 50 mm.

The position of the swing arm bearing 3 is illustrated only exemplarily in FIG. 3. The swing arm bearing 3 may also be arranged at different locations, like directly at the drive device 1. In FIG. 3, the swing arm bearing 3 is arranged above the output shaft 9. However, it is also conceivable for the swing arm bearing 3 to be arranged below the output shaft 9.

In accordance with the invention, the swing arm bearing 3 is arranged close to the output shaft 9. More precisely, the swing arm bearing 3 is arranged closer to the output shaft 9 than to the first drive shaft 6. This means that, in accordance with the invention, the radial distance R2 between the output shaft 9 and the swing arm bearing 3 is smaller than the radial distance R3 between the output shaft 9 and the first drive shaft 6.

Figure 4:
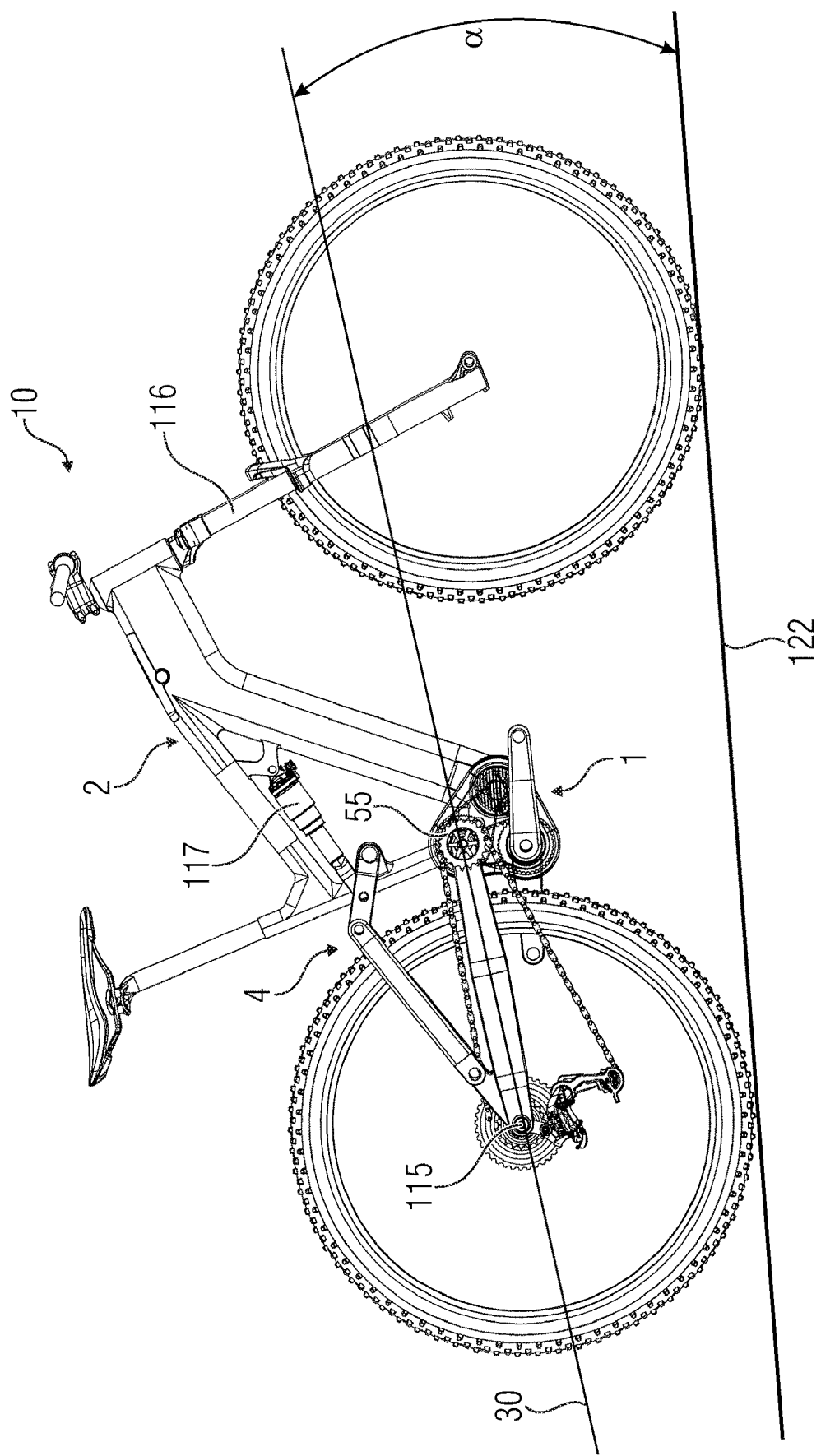
FIG. 4 shows a side view of a bicycle driven by an electric motor, comprising a rear linkage element implemented as a single pivot, and an inventive drive device.

FIG. 4 shows a bicycle 10 comprising an inventive drive device 1, wherein the swing arm bearing 3 is positioned at the main frame 2 such that the bicycle 10 will comprise a suspension oblique angle α of 5° to 30° if the bicycle 10 is subjected to a static load resulting in a negative spring deflection between 15% and 35% of the total spring deflection.

In other words, in the state illustrated in FIG. 4, the bicycle 10 is in the SAG, which means that the spring elements 116, 117 and, in particular, the damper 117 arranged in the back are compressed by about 15% to 35% of their total spring deflection.

The bicycle 10 illustrated, or the rear linkage element 4 of the bicycle 10, is designed as a single pivot. Consequently, the straight 30 passing through the rear axis 115 and through the swing arm bearing 3 defines the suspension oblique angle α relative to the road surface 122.

It can be recognized from FIG. 4 that the suspension oblique angle α may be influenced by suitably positioning the swing arm bearing 3 at the main frame 2. In accordance with the invention, the swing arm bearing 3 is positioned at the main frame 2 such that the bicycle will comprise a suspension oblique angle α of 5° to 30°, advantageously 10° to 20° and even more advantageously of about 15° if the bicycle 10 is subjected to a static load resulting in a negative spring deflection between 10% and 35% of the total spring deflection.

Figure 5:
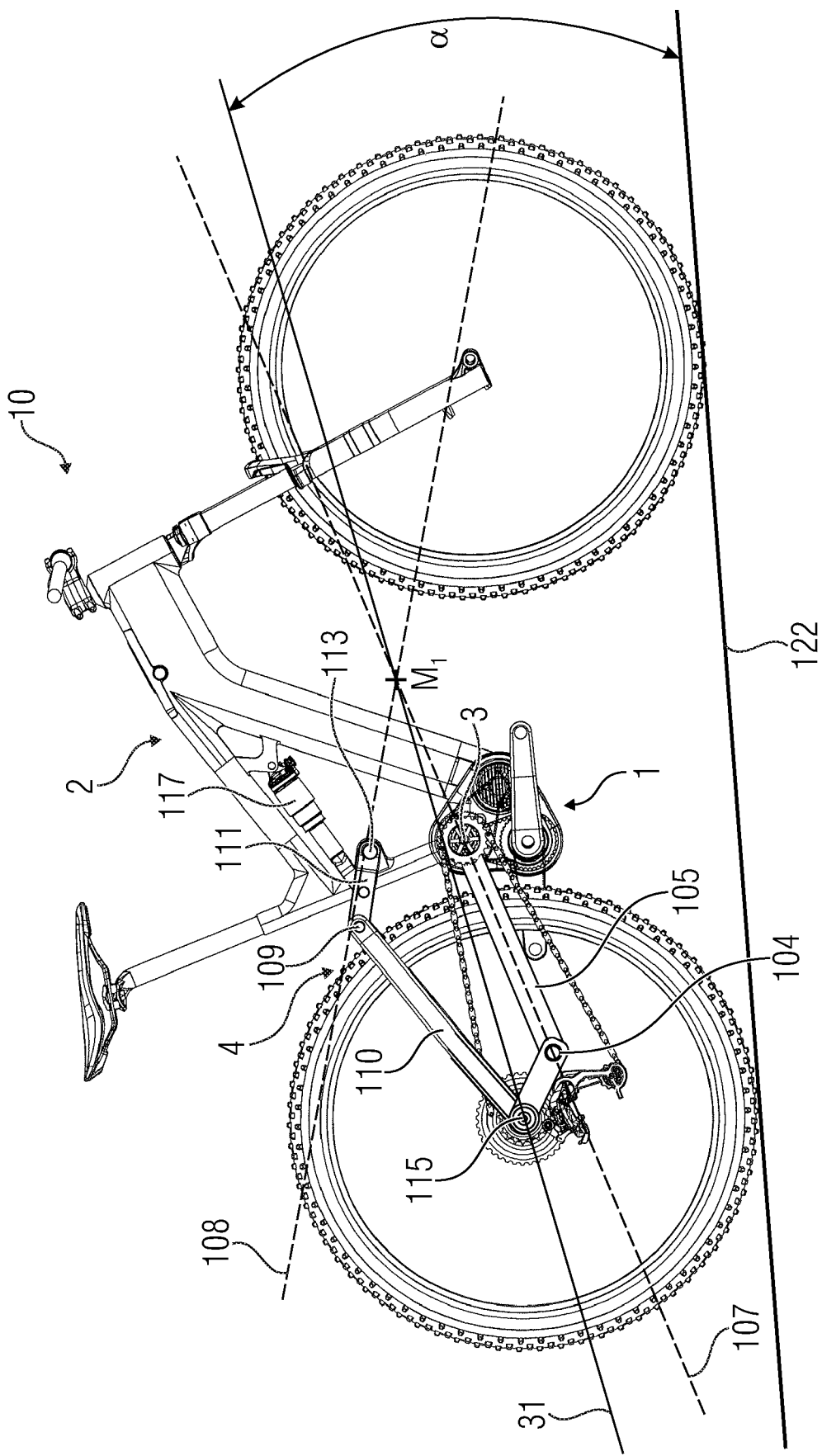
FIG. 5 shows a side view of a bicycle driven by an electric motor, comprising a rear linkage element implemented as a multi pivot, and an inventive drive device.

FIG. 5 shows another embodiment of a bicycle 10 comprising an inventive drive device 1. In contrast to the embodiment discussed referring to FIG. 4, in this case the rear linkage element 4 is designed a multi pivot, i.e. the rear linkage element 4 comprises an additional hinge 104. The additional hinge 104 is arranged in the region of the chain stay 105. However, it is also conceivable for the additional hinge 104 to be arranged in the region of the seat stay 110.

The bicycle 10 illustrated in FIG. 5 is in the SAG, i.e. is subjected to a static load resulting in a negative spring deflection between 10% and 35% of the total spring deflection of the damper 117.

In the multi pivot shown in FIG. 5, an instant center $M_1$ can be designed for the state illustrated. A first straight 107 intersects the additional hinge 104 and the swing arm bearing 3. A second straight 108 passes through the hinge 109 between the seat stay 110 and the rocker 111 and through the hinge 113 between the rocker 111 and the main frame 2 or seat tube 24. The point of intersection of the two straights 107, 108 results in the instant center $M_1$.

A straight 31 passes through this instant center $M_1$ and the rear axis 115. This straight 31 defines the suspension oblique angle α relative to the road surface 122 in a multi pivot, as is exemplarily illustrated in FIG. 5.

It is to be mentioned that the designed instant center $M_1$ applies only for the illustrated state of the bike 10. As soon as the bicycle 10 is compressed or decompressed, the position of the straights 107, 108 relative to each other changes and the instant center is shifted to a different position. The instant center is the state-dependent instantaneous point of rotation of the rear linkage element 4 by which the rear axis 115 pivots in the state illustrated.

The rear linkage element 4 illustrated in FIG. 5 consequently is designed as a multi pivot having an instant center $M_1$ as an instantaneous point of rotation. In accordance with the invention, the rear linkage element 4 is positioned at the main frame 2 such that the bicycle 10 will comprise a suspension oblique angle α of 5° to 30°, advantageously 10° to 20° and even more advantageously of about 15° if the bicycle 10 is subjected to a static load resulting in a negative spring deflection between 10% and 35% of the total spring deflection.

Figure 6:
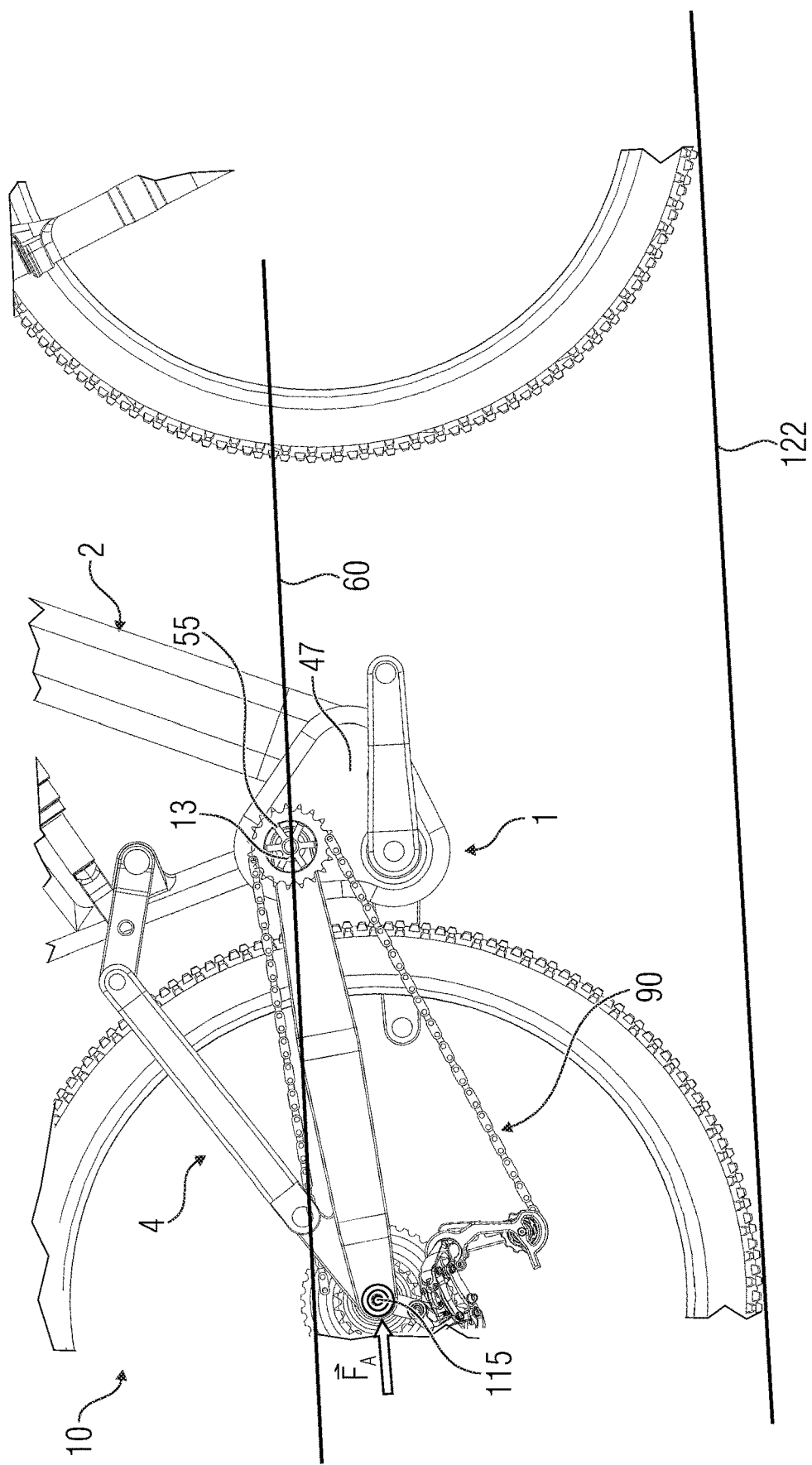
FIG. 6 shows an enlarged section of a bicycle driven by an electric motor, comprising an inventive drive device in a side view.

FIG. 6 shows an enlarged section of a bicycle 10 comprising an inventive drive device 1.

The road surface 122 and a plane 60 in parallel thereto can be recognized. The plane 60 parallel to the road surface passes through the center axis 13 of the output element 8. The swing arm bearing 3 may be arranged at the main frame 2 such that the center axis of the swing arm bearing 3 is arranged above this plane 60. In this case, a force $F_A$ applied to the rear wheel axis 115 by means of chain pull results in decompression of the rear linkage element 4.

In an alternative embodiment, the swing arm bearing 3 may be arranged at the main frame 2 such that the center axis of the swing arm bearing 3 is arranged below the plane 60. In this case, a force $F_A$ acting on the rear wheel axis 115 by means of the chain pull results in compression of the rear linkage element 4.

Figure 7:
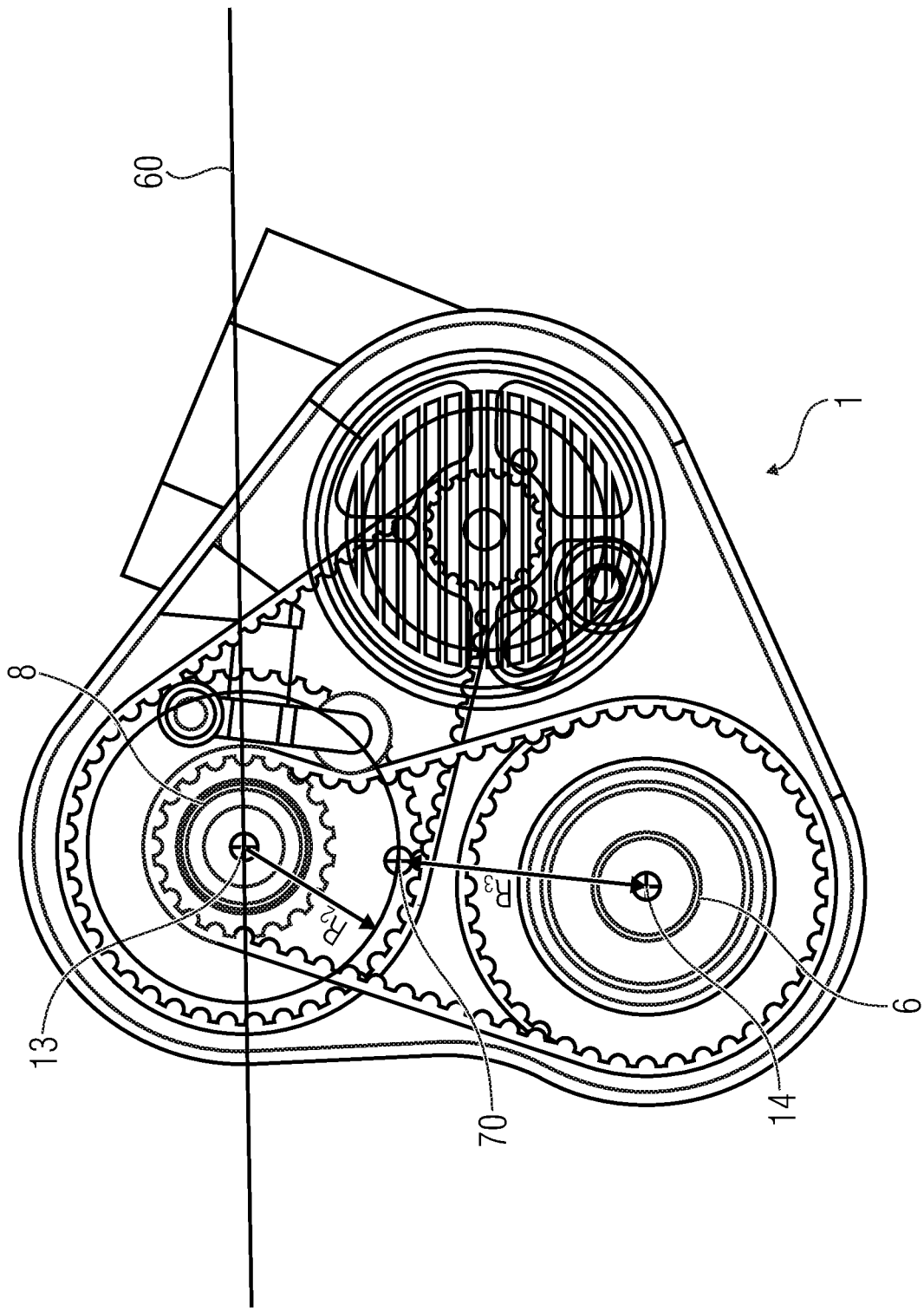
FIG. 7 shows a side view of an inventive drive device.

FIG. 7 shows the enlarged illustration of the inventive drive device 1, as has already been shown in FIG. 3, again. The center axis 13 of the output element 8 can be recognized. In addition, the plane 60 parallel to the road surface 122 is shown.

The swing arm bearing 3 may thus be arranged relative to the center axis 13 of the output element 8 such that the center axis of the swing arm bearing 3 is arranged either above or below the plane 60, depending on which behavior (compression or decompression) of the rear linkage element is desired.

Exemplarily, a circle of a radius $R_2$ around the center axis 13 of the output element 8 is shown. The radius $R_2$ exemplarily describes a region where the center axis of the swing arm bearing 3 may be arranged. The swing arm bearing 3 may exemplarily be arranged around the center axis 13 of the output element 8 such that the center axis of the swing arm bearing 3 is distanced radially, like by a value $R_2$, from the center axis 13 of the output element 8.

In FIG. 7, such a potential point of attachment 70 is shown purely exemplarily. In accordance with the invention, the swing arm bearing 3 may be arranged around the output element 8 such that the center axis of the swing arm bearing 3 comprises any radial distance to the center axis 13 of the output element 8, but while keeping the inventive condition that the radial distance $R_2$ between the center axis of the swing arm bearing 3 and the center axis 13 of the output shaft 9 be smaller than the radial distance $R_3$ between the center axis of the swing arm bearing 3 and the center axis 14 of the first drive shaft 6.

The swing arm bearing 3 consequently is to be arranged close to the output element 8 and advantageously closer to the output element 8 than to the drive shaft 6.

In an advantageous implementation of the invention, the radial distance $R_2$ between the center axis 13 of the output shaft 9 and the center axis of the swing arm bearing 3 equals zero ($R_2$=0). This means that the center axis 13 of the output shaft 9 and the center axis of the swing arm bearing 3 are concentric or coaxial.

Figure 8:
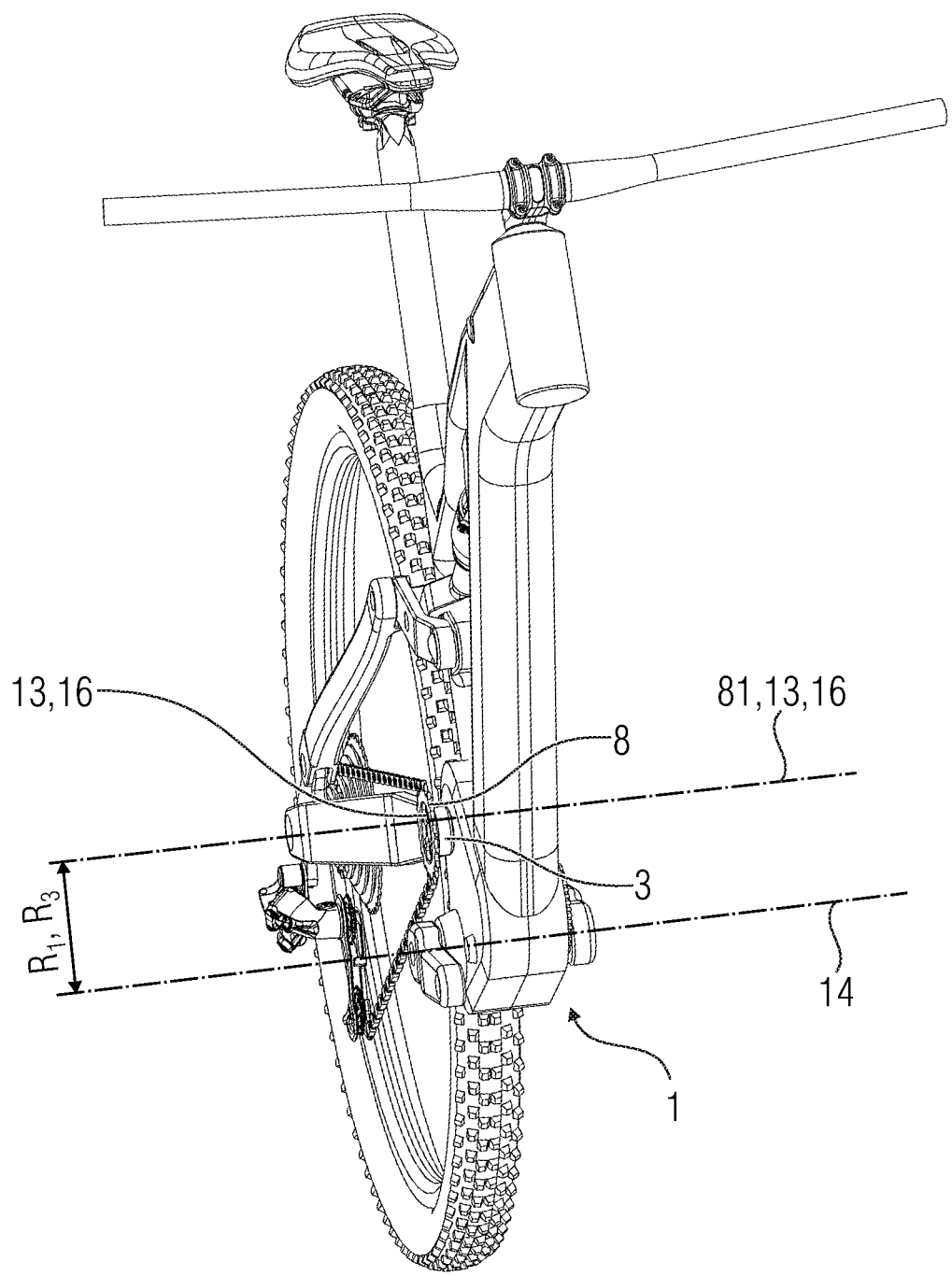
FIG. 8 shows a front perspective view of a bicycle driven by an electric motor, comprising an inventive drive device, without illustrating the front wheel and the suspension fork.

This can be recognized clearly in FIG. 8. FIG. 8 shows a front perspective view of a bicycle comprising an inventive drive device 1. For improved clarity, the suspension fork and the front wheel are not illustrated.

It can be recognized here that the swing arm bearing 3 and the output element 8 are arranged to be coaxial to each other. The center axis 13 of the output element 8 and the center axis 16 of the swing arm bearing 3 are thus located on a common axis 81. This means that the axis 81 is the common center axis of the output element 8 and the swing arm bearing 3.

Additionally, the center axis 14 of the first drive, i.e. the pedal crank 5, is shown. The center axis 14 of the first drive 5 is in parallel to the common center axis 81 of the swing arm bearing 3 and the output element 8. Additionally, it can be recognized that the output element 8 and the swing arm bearing 3 are arranged to be radially distanced from the first drive 5. More precisely, the radial distance $R_1$ between the center axis 14 of the first drive 5 and the center axis 13 of the output element 8 can be seen. Since the output element 8 and the swing arm bearing 3 are arranged coaxially, the radial distance $R_3$ between the center axis of the first drive 5 and the center axis 16 of the swing arm bearing 3 equals the radial distance $R_1$ between the center axis 14 of the first drive 5 and the center axis 13 of the output element 8 ($R_1$=$R_3$).

Figure 9:
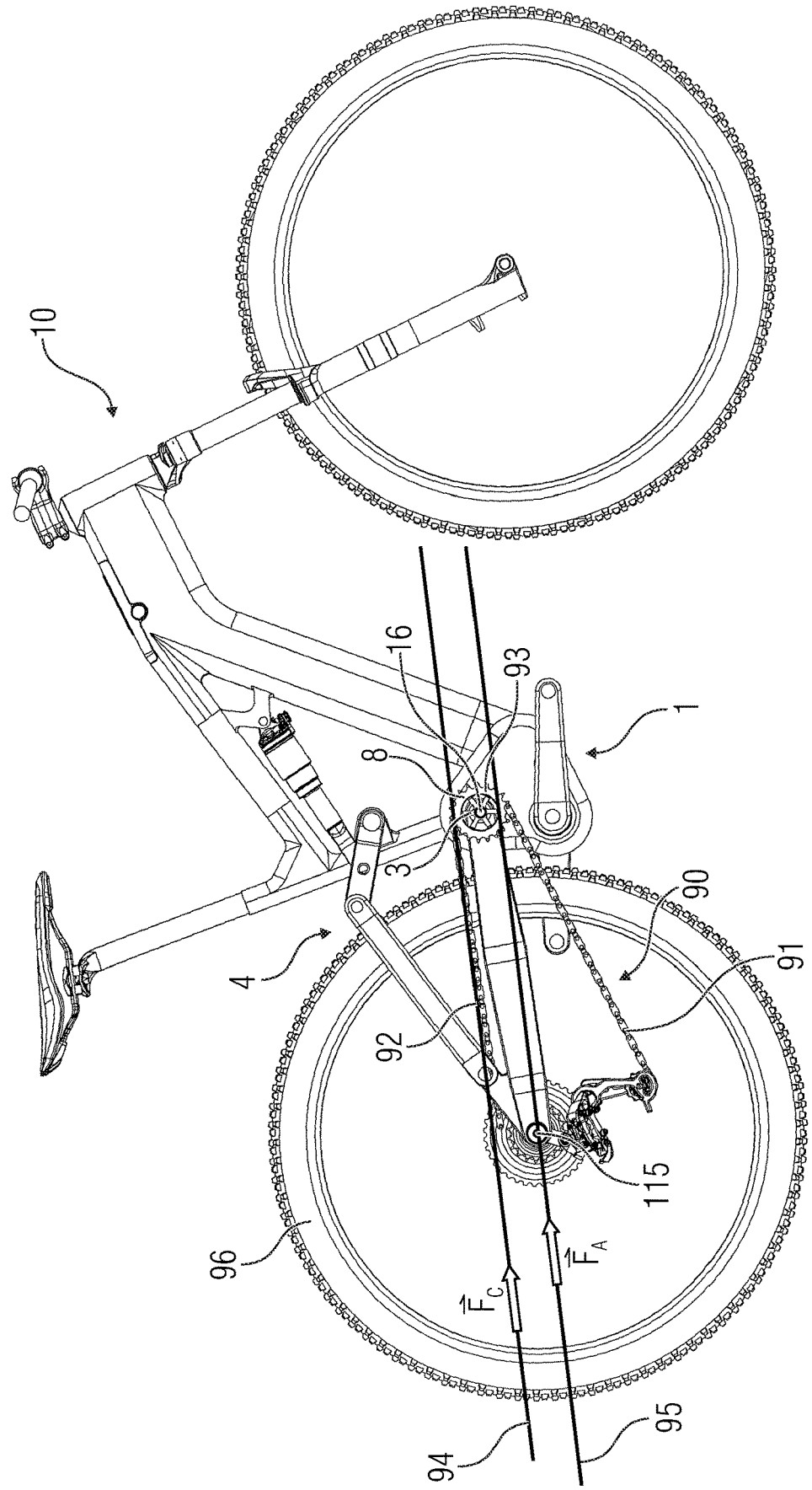
FIG. 9 shows a side view of a bicycle driven by an electric motor, comprising an inventive drive device having a chain drive.

FIG. 9 shows a side view of a bicycle 10 comprising an inventive drive device 1. Again, the bicycle 10 is shown in the SAG, i.e. in a static load state where a static force acts on the bicycle 10, which causes compression of the damper 117 by 10% to 35% of the total spring deflection of the damper 117.

As has already been mentioned before, the direction of the force $F_A$ applied to the rear axis 115 is determined by the pull direction of the force transmission means between the output element 8 and the rear wheel 96.

In the embodiment shown in FIG. 9, a conventional bicycle chain 90 is illustrated as force transmission means. The bicycle chain 90 comprises a slack side 91 and a tight side 92. The output element 8 comprises a pinion 93 around which the bicycle chain 9 is wound.

When applying a pull force to the tight side 92 of the bicycle chain 90, the result will be a chain pull force $F_C$ acting along the force action line 94. The resulting force $F_A$ acting on the rear wheel axis 115 is directed to be parallel to the chain pull force $F_C$. The force $F_A$ acting on the rear wheel axis 115 acts along the force action line 95.

The output element 8 transmits a drive force $F_C$ to the rear wheel 96 of the bicycle 10 to be driven by means of the bicycle chain 90. Thus, the bicycle chain 90 is arranged between the output element 8 and the rear wheel 96 such that a force $F_A$ is applied to the rear axis 115 by means of applying a pull force to the bicycle chain 90, wherein the force action line 95 of the force $F_A$ is located below the center axis 16 of the swing arm bearing 3. This is particularly true for rear linkage elements 4 designed as single pivots. The result will be decompression of the rear linkage element 4 when accelerating, starting, riding uphill etc.

When the rear linkage element 4 is a multi pivot, in accordance with the invention, the same will be designed such that the force action line 95 of the force $F_A$ acting on the rear wheel axis 115 is located below the instant center if the bicycle is subjected to a static load resulting in a negative spring deflection between 10% and 35% of the total spring deflection.

Figure 10:
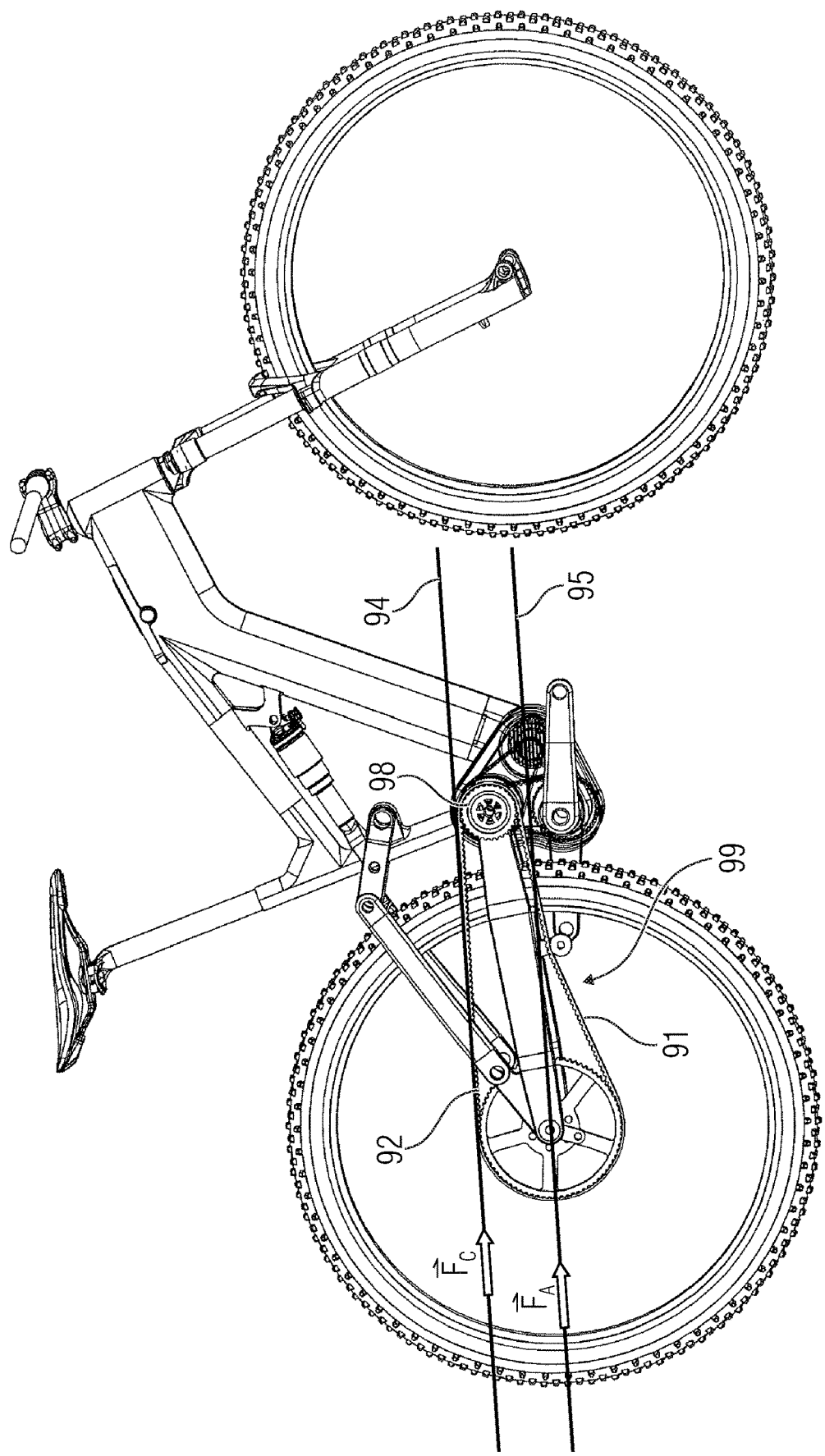
FIG. 10 shows a side view of a bicycle driven by an electric motor, comprising an inventive drive device having a cog belt drive.

FIG. 10 shows another embodiment of a bicycle 10 comprising an inventive drive device 1. Here, the force transmission means is implemented as a cog belt 99. Correspondingly, the output element 8 comprises a gear 98 around which the cog belt 99 is wound. The cog belt 99 comprises a tight side 92 and a slack side 91.

When applying a pull force to the tight side 92 of the cog belt 99, the result will be a pull force $F_C$ acting along the force action line 94. The resulting force $F_A$ acting on the rear wheel axis 115 is directed to be parallel to the pull force $F_C$. The force $F_A$ acting on the rear wheel axis 115 acts along the force action line 95.

This means that the output element 8 transmits a drive force $F_C$ to the rear wheel 96 of the bicycle 10 to be driven by means of the cog belt 99. Thus, the cog belt 99 is arranged between the output element 8 and the rear wheel 96 such that a force $F_A$ is applied to the rear axis 115 by means of applying a pull force to the cog belt 99, wherein the force action line 95 of the force $F_A$ is located below the center axis 16 of the swing arm bearing 3. This particularly applies to rear linkage elements 4 designed as single pivots. The result is decompression of the rear linkage element 4 when accelerating, starting, riding uphill etc.

When the rear linkage element 4 is a multi pivot, in accordance with the invention, it is designed such that the force action line 95 of the force $F_A$ acting on the rear wheel axis 115 is located below the instant center if the bicycle is subjected to a static load resulting in a negative spring deflection between 10% and 35% of the total spring deflection.

This means that the invention provides a starting torque pitch support which may be realized both by means of the kinematics of the rear linkage element 4 and by means of applying a pull force to the respective force transmission means 90, 99.

Figure 11:
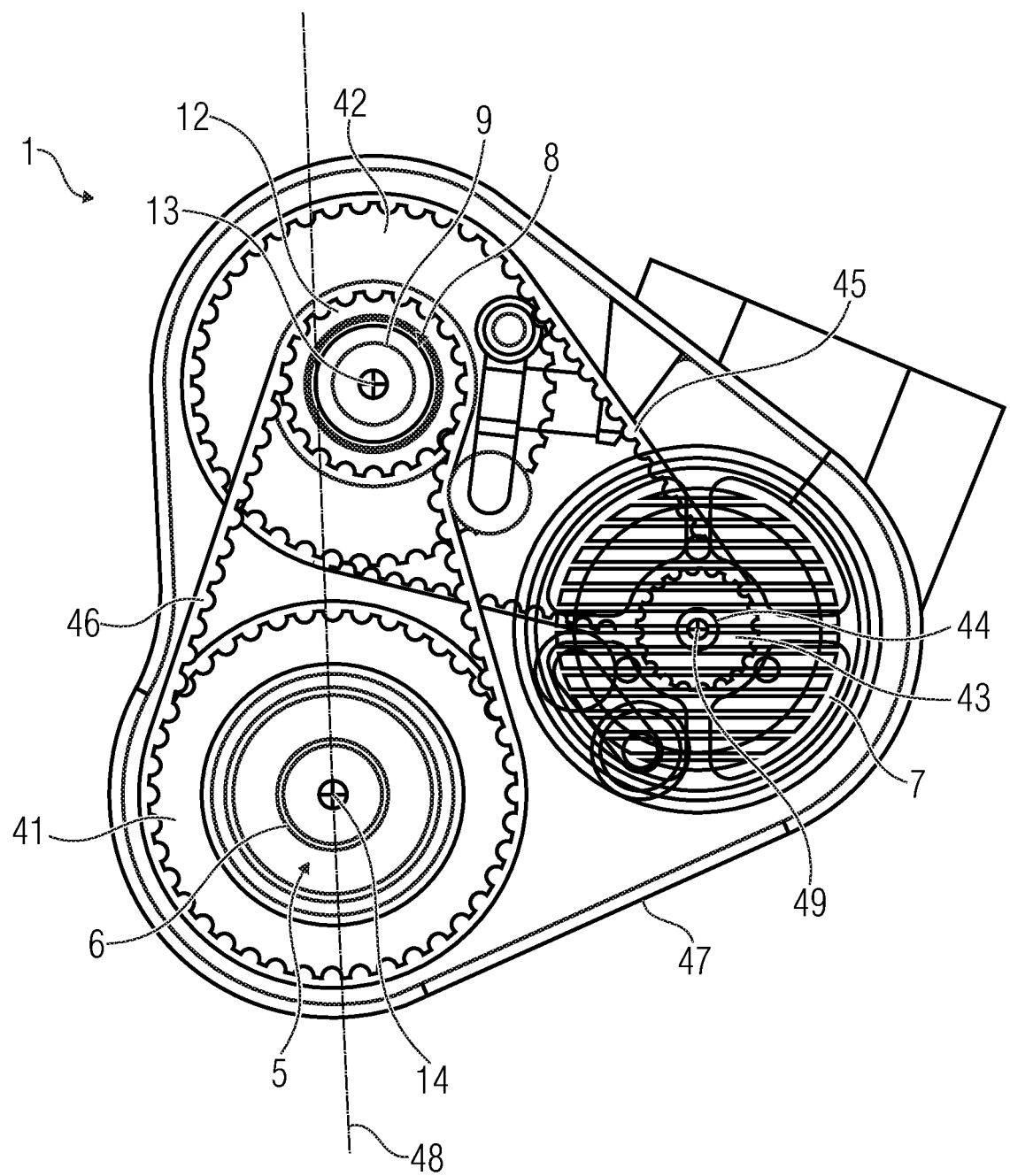
FIG. 11 shows a side view of an inventive drive device.

FIG. 11 shows an enlarged side view of an inventive drive device 1 again. The drive device 1 comprises several components, among others drive and output elements of different gear ratios.

The first drive 5 comprises a first drive shaft 6. The drive shaft 6 may be the bottom bracket shaft of the pedal crank. A gear 41 is arranged at the first drive shaft 6.

The output element 8 comprises an output shaft 9. A gear 12 is arranged at the output shaft 9. The gear 12 arranged at the output shaft 9 is coupled to the gear 41 arranged at the drive shaft 6 of the first drive 5 by means of a cog belt 46.

The gear 12 arranged at the output shaft 9 comprises fewer teeth or smaller a diameter than the gear 41 arranged at the drive shaft 6 of the first drive 5. This means that a speeding gear ratio from the first drive 5 to the output element 8 results, wherein the gear ratio is 3:1 or advantageously 2:1.

Another gear 42 is arranged at the output shaft 9. The second gear 42 is coupled to a gear 43 arranged at an output shaft 44 of the electric motor 7 by means of a cog belt 45.

The gear 42 arranged at the output shaft 9 comprises more teeth or greater a diameter than the gear 43 arranged at the output shaft 43 of the electric motor 7. Thus, a gear ration to slow down results from the drive (electric motor 7) to the output element 8, wherein the gear ration is 1:2 or advantageously 1:3.

The cog belts 45, 46 illustrated may be replaced by drive chains. In this case, the gears 12, 41, 42, 43 would advantageously be implemented as pinions. The cog belts 45, 46 illustrated, however, may also be replaced by V-belts. In this case, the gears 12, 41, 42, 43 would advantageously be implemented to be profile rolls. Direct engagement of at least one pair of gears between the electric motors 7 and the output element 8 and/or between the first drive 5 and the output element 8 would also be conceivable.

The drive device 1 may comprise a casing 47 where the first drive 5, the electric motor 7 and the output element 8 are arranged. The electric motor 7 may be mounted to the casing 47, wherein cooling fins may be provided in the casing 47 at the location of mounting in order to cool down the motor 7. The electric motor 7 may be implemented to be an external rotor motor and, advantageously, a torque motor.

In FIG. 11, a straight 48 can be recognized, passing through the center axis 14 of the first drive 5. This straight 48 is perpendicular to the road surface 122 (not illustrated here). The center axis 13 of the output element 8 and the center axis 49 of the output shaft 44 of the electric motor 7 are arranged, in a forward riding direction, in front of the perpendicular 48 and, thus, in front of the center axis 14 of the first drive 5.

However, it is also conceivable for the output element 8 to be arranged such that its center axis 13, in the forward riding direction, is arranged behind the perpendicular 48 and, thus, behind the center axis 14 of the first drive 5. Thus, the chain stay of the rear linkage element can be kept short, in case the center axis 13 of the output element 8 is arranged coaxially to the swing arm bearing 3.

In accordance with an embodiment (not illustrated here in greater detail), the electric motor 7 may be arranged relative to the output element 8 such that the center axis 13 of the output element 8 is coaxial to the center axis 49 of the output shaft 44 of the electric 7.

Thus, the output element 8 would be coupled directly to the output shaft 44 of the electric motor 7. In other words, the electric motor 7 and the output element 8 share a common shaft. In this case, the connective cog belt 45 illustrated in FIG. 11 and the gear 43 arranged at the output shaft 44 and the output-side gear 42 may consequently be omitted.

As has been mentioned before, the arrangement, presently described, of the individual components within the drive device 1 comprises a certain gear ratio. In the case just described according to which the center axis 13 of the output element 8 is arranged to be coaxial to the center axis 49 of the motor output shaft 44, the electric motor 7 may comprise an internal transmission for realizing the desired gear ratio, i.e. for outputting a desired rotational speed or desired torque directly at the output shaft 40.

In this case, the inventive drive device 1 would comprise two shafts, i.e. shaft 6 of the first drive 5 and the output shaft 44 shared by the electric motor 7 and the output element 8, the center axis 49 of which is arranged to be coaxial to the center axis 13 of the output element 8. In the case of such a two-shaft operation, it would also be feasible for the first drive 5 to be coupled to the common output shaft 44 at a gear ratio of 1:3 or advantageously 1:2.

The electric motor 7 comprises an internal transmission with a gear ratio of 2:1 or, advantageously, 3:1. Via the output shaft 44, the electric motor 7 transfers the desired torque or the desired rotational speed to a chain ring, pinion, gear 55 (FIG. 6) or the like arranged at the output shaft 44. The gear 55 is coupled to the force transmission means used for driving, like a chain 90 or a cog belt or the like. The pinion 55 may be arranged outside the casing 47 of the drive device 1 (FIG. 6). The pinion 55 may also be arranged within the casing 47. Corresponding recesses in the casing 47 for performing the force transmission means 90 would be used here.

Apart from the two-shaft operation just mentioned, a three-shaft operation is also possible using the inventive drive device 1. This is illustrated schematically in FIG. 12.

Figure 12:
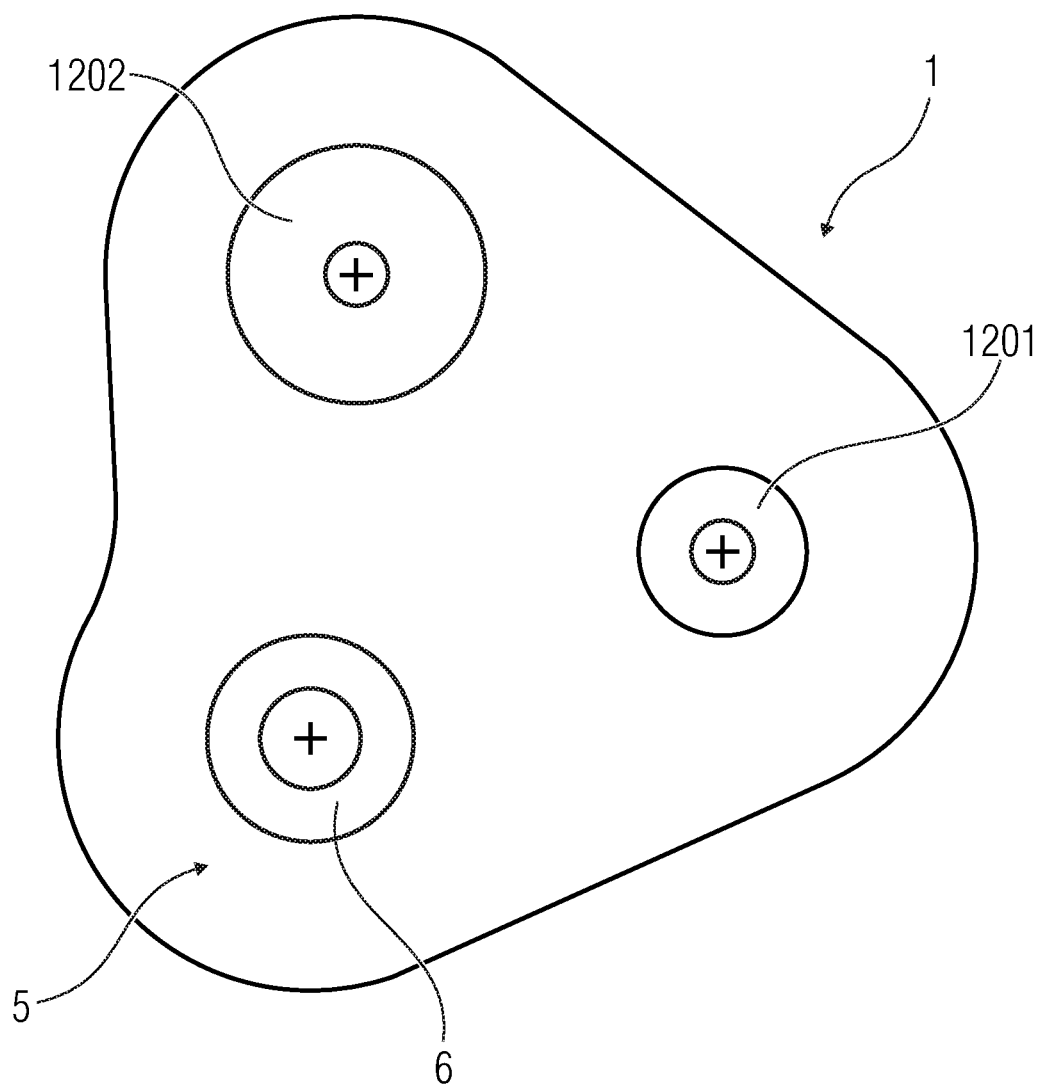
FIG. 12 shows a schematic drawing of an inventive drive device in a side view.

FIG. 12 shows the drive shaft 6 of the first drive 5 where the pedal crank is arranged. This schematically illustrated drive device 1 additionally comprises a first additional shaft 1201 and a second additional shaft 1202. The shafts 6, 1201, 1202 may be connected among one another in the following three configurations as shown in tables 1 to 3 below.

TABLE 1

| CONFIGURATION 1 | | | |
|---|---|---|---|
| first drive 5 (pedal crank) → | first additional shaft 1201 → | second additional shaft 1202 → | rear wheel axis 115 |
| | motor | reduction gearing | transmission (like hub, derailleur) |

TABLE 2

| CONFIGURATION 2 | | | |
|---|---|---|---|
| first drive 5 (pedal crank) → | first additional shaft 1201 → | second additional shaft 1202 → | rear wheel axis 115 |
| | transmission | motor | increase gearing |

TABLE 3

| CONFIGURATION 3 | | | |
|---|---|---|---|
| first drive 5 (pedal crank) → | first additional shaft 1201 → | second additional shaft 1202 → | rear wheel axis 115 |
| | motor | transmission | increase gearing |

In order to ensure a reliable functioning of the drive device 1, at least two freewheels are to be provided. Freewheels may generally be provided at every shaft, i.e. both at the first drive shaft 6, the output shaft 9, the motor output shaft 44 and the rear axis shaft 115. An advantageous implementation provides for one freewheel to be provided at the rear axis shaft 115 and one freewheel at the pedal crank shaft (first drive shaft) 6.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A drive device for a bicycle driven by an electric motor, comprising a main frame comprising a swing arm bearing, and a rear linkage element arranged at the swing arm bearing, the drive device comprising:
    a pedal crank as a first drive for providing a first drive force, the first drive comprising a first drive shaft, a center electric motor as a second drive for providing a second drive force, and
    an output element comprising an output shaft, the output element being configured to receive the first and/or second drive forces and transfer the same to the wheel of the bicycle to be driven,
    wherein the center axis of the output shaft is radially distanced from the center axis of the first drive shaft and the output shaft is arranged relative to the swing arm bearing such that a radial distance between the center axis of the swing arm bearing and the center axis of the output shaft is smaller than a radial distance between the center axis of the swing arm bearing and the center axis of the first drive shaft, and
    wherein the swing arm bearing is positioned at the main frame such that the bicycle comprises a suspension oblique angle α of 5° to 30°, or 10° to 20°, or 15° if the bicycle is subjected to a static load resulting in a negative spring deflection between 10% and 35% of the total spring deflection.

2. The drive device in accordance with claim 1, wherein the radial distance between the center axis of the first drive shaft and the center axis of the output shaft is 200 mm to 300 mm, or 100 mm to 200 mm.

3. The drive device in accordance with claim 1, wherein the radial distance between the center axis of the swing arm bearing and the center axis of the output shaft is less than 200 mm, or less than 100 mm, or less than 50 mm.

4. The drive device in accordance with claim 1, wherein the center axis of the swing arm bearing, relative to a plane parallel to the road surface, is arranged above the center axis of the output element.

5. The drive device in accordance with claim 1, wherein the center axis of the swing arm bearing, relative to a plane parallel to the road surface, is arranged below the center axis of the output element.

6. The drive device in accordance with claim 1, wherein the radial distance between the center axis of the output shaft and the center axis of the swing arm bearing equals zero so that the center axis of the output shaft and the center axis of the swing arm bearing are arranged concentrically.

7. The drive device in accordance with claim 1, wherein the output element and the center electric motor are arranged relative to each other such that the center axis of the output element and the center axis of an output shaft of the center electric motor are arranged concentrically.

8. The drive device in accordance with claim 1, wherein the output element transfers the drive force to the wheel of the bicycle to be driven by means of a force transmission element and the force transmission element is arranged between the output element and the wheel such that a force is applied to a rear axis by means of applying a pull force to a tight side of the force transmission element, wherein a force action line of the force is located below the center axis of the swing arm bearing or below the instant center if the bicycle is subjected to a static load resulting in a negative spring deflection between 10% and 35% of the total spring deflection.

9. The drive device in accordance with claim 1, the drive device being arranged at the main frame to be immobile.

10. A bicycle driven by an electric motor, comprising a drive device in accordance with claim 1.

11. A bicycle frame comprising a main frame comprising a swing arm bearing, a rear linkage part arranged at the swing arm bearing, and a drive device in accordance with claim 1.

12. A drive device for a bicycle driven by an electric motor, comprising a main frame comprising a swing arm bearing, and a rear linkage element arranged at the swing arm bearing, the drive device comprising:
    a pedal crank as a first drive for providing a first drive force, the first drive comprising a first drive shaft,
    a center electric motor as a second drive for providing a second drive force, and
    an output element comprising an output shaft, the output element being configured to receive the first and/or second drive forces and transfer the same to the wheel of the bicycle to be driven,
    wherein the center axis of the output shaft is radially distanced from the center axis of the first drive shaft and the output shaft is arranged relative to the swing arm bearing such that a radial distance between the center axis of the swing arm bearing and the center axis of the output shaft is smaller than a radial distance between the center axis of the swing arm bearing and the center axis of the first drive shaft, wherein the rear linkage element is implemented as a multi pivot, comprising an instant center as an instantaneous center of rotation, and the rear linkage element is positioned at the main frame such that the bicycle comprises a suspension oblique angle α of 5° to 30°, or 10° to 20°, or 15° if the bicycle is subjected to a static load resulting in a negative spring deflection between 10% and 35% of the total spring deflection.

* * * * *